(12) United States Patent
Hammarwall et al.

(10) Patent No.: US 8,767,681 B2
(45) Date of Patent: Jul. 1, 2014

(54) PARAMETERIZED CODEBOOK SUBSETS FOR USE WITH PRECODING MIMO TRANSMISSIONS

(75) Inventors: David Hammarwall, Stockholm (SE); George Jöngren, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 433 days.

(21) Appl. No.: 13/080,826

(22) Filed: Apr. 6, 2011

(65) Prior Publication Data

US 2011/0249637 A1    Oct. 13, 2011

Related U.S. Application Data

(60) Provisional application No. 61/321,679, filed on Apr. 7, 2010.

(51) Int. Cl.
| | |
|---|---|
| H04W 4/00 | (2009.01) |
| H04B 7/005 | (2006.01) |
| H04B 1/44 | (2006.01) |
| H04J 3/16 | (2006.01) |

(52) U.S. Cl.
USPC ............ 370/334; 370/278; 370/282; 370/437

(58) Field of Classification Search
USPC ......... 370/249, 252, 254, 278, 282, 329, 332, 370/334, 437
See application file for complete search history.

(56) References Cited

U.S. PATENT DOCUMENTS

| | | | |
|---|---|---|---|
| 2007/0191066 A1* | 8/2007 | Khojastepour et al. | ..... 455/562.1 |
| 2007/0242770 A1* | 10/2007 | Kim et al. | ..... 375/267 |
| 2009/0006518 A1* | 1/2009 | Rensburg et al. | ..... 708/520 |
| 2009/0274225 A1* | 11/2009 | Khojastepour et al. | ..... 375/260 |

FOREIGN PATENT DOCUMENTS

| | | | | |
|---|---|---|---|---|
| WO | 2009/025619 A2 | 2/2009 | | |
| WO | WO 2009025619 A2 * | 2/2009 | ............... | H04B 7/06 |

OTHER PUBLICATIONS

3rd Generation Partnership Project. "Further Refinements of Feedback Framework." 3GPP TSG-RAN WG1 #60bis, R1-101742, Beijing, China, Apr. 12-16, 2010.

3rd Generation Partnership Project. "Possible Refinement on 8Tx Codebook Design." 3GPP TSG RAN WG1 60bis, R1-102104, Beijing, China, Apr. 12-16, 2010.

(Continued)

*Primary Examiner* — Redentor Pasia
(74) *Attorney, Agent, or Firm* — Coats and Bennett, P.L.L.C.

(57) ABSTRACT

One aspect of the teachings presented herein provides advantages for sending precoder selection feedback from a transceiver to another transceiver, for use by the other transceiver as precoding recommendations. The transceiver generates two types of precoder selection feedback, where one type uses a smaller signaling payload than the other and therefore provides a distinct reduction in the signaling overhead associated with reporting precoding recommendations. The transceiver uses the reduced-overhead type of reporting when reporting at certain times, or on certain channels, or in response to control signaling. In one example, a UE in an LTE network sends precoder information to an eNodeB on the PUCCH by sending smaller-range index values that index only a subset of precoders, but sends full-range index values when reporting on the PUSCH, which index a larger set of precoders.

30 Claims, 6 Drawing Sheets

(56) References Cited

OTHER PUBLICATIONS

3rd Generation Partnership Project. "CQI and MIMO Feedback for LTE." 3GPP TSG RAN WG1 #50-bis Meeting, R1-074356, Shanghai, China, Oct. 8-12, 2007.

3rd Generation Partnership Project. "Persistent CQI/PMI/Rank Reporting on PUCCH/PUSCH." 3GPP TSG RAN WG1 Meeting #52, R1-080765, Sorrento, Italy, Feb. 11-15, 2008.

3rd Generation Partnership Project. "Multiple Granularity Feedback Design for LTE-A." 3GPP TSG-RAN WG1 #60, R1-101399, San Fransicso, CA, USA, Feb. 22-26, 2010.

3rd Generation Partnership Project. "Precoding Codebook Design for 4 Node-B Antenna." 3GPP TSG RAN WG1 48bis, R1-071798, St. Julian's, Malta, Mar. 26-30, 2007.

3rd Generation Partnership Project. "Configuration of Feedback Mode for MIMO Transmission." 3GPP TSG RAN WG1 Meeting #60, R1-101287, San Francisco, CA, USA, Feb. 22-26, 2010.

3rd Generation Partnership Project. "Way Forward for MU-MIMO Design." 3GPP TSG RAN WG1 Meeting #49bis, R1-073100, Orlando, FL, USA, Jun. 25-29, 2007.

3rd Generation Partnership Project. "PMI-Based Multi-Granular Feedback for SU/MU-MIMO Operation." 3GPP TSG-RAN WG1 #60, R1-100852, San Francisco,CA, USA, Feb. 22-26, 2010.

* cited by examiner

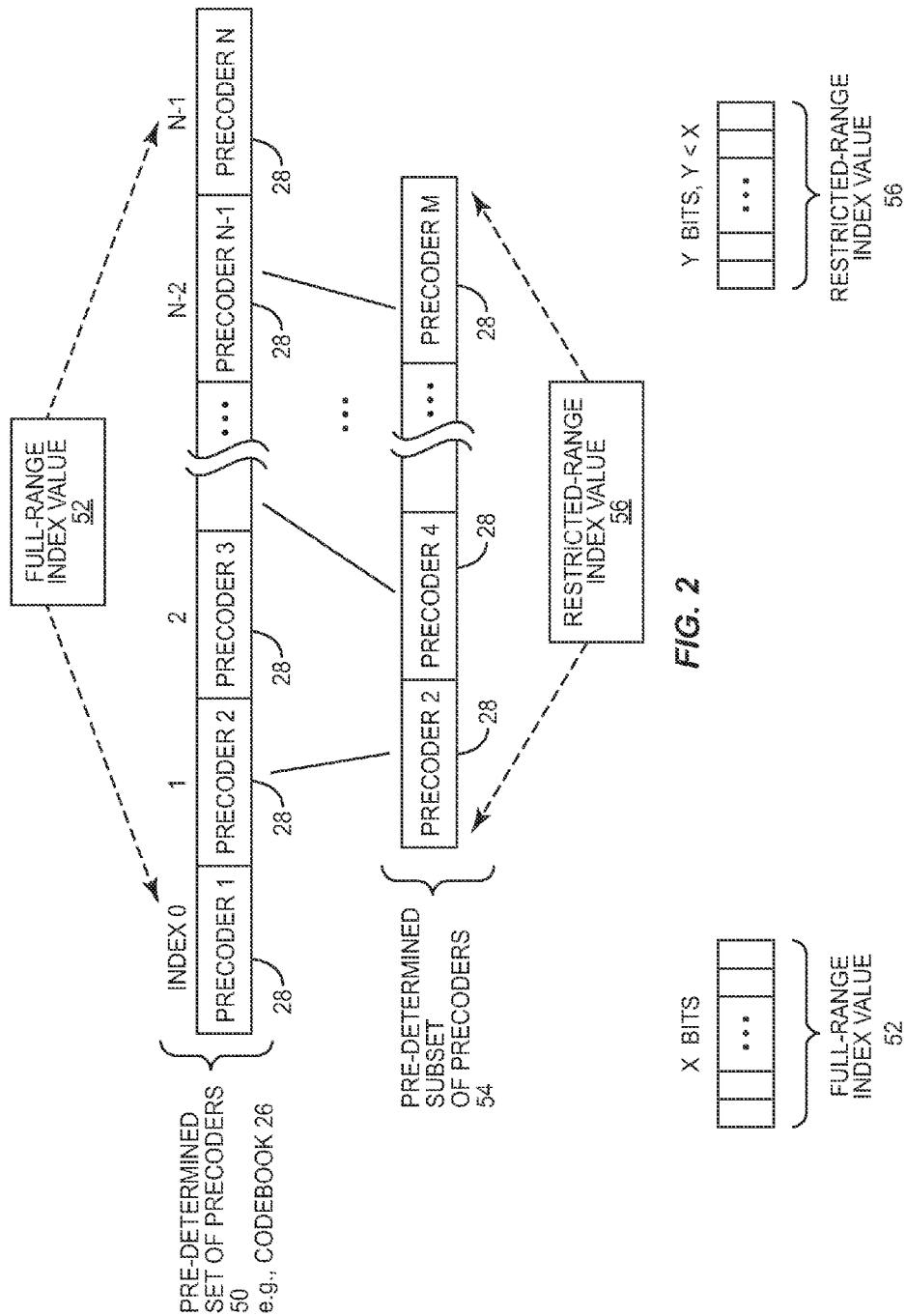

PARAMETERIZED CODEBOOK SUBSETS FOR USE WITH PRECODING MIMO TRANSMISSIONS

RELATED APPLICATIONS

This application claims priority from the U.S. provisional patent application filed on 7 Apr. 2010 and identified by Application No. 61/321,679, and which is explicitly incorporated herein by reference.

FIELD OF THE INVENTION

The teachings herein generally relate to codebooks and precoding, and particularly relate to the use of parameterized codebook subsets, such as may be used to restrict codebook selections for different Multiple-Input-Multiple-Output (MIMO) modes of operation.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and related techniques are commonly referred to as MIMO.

The 3GPP LTE standard is currently evolving with enhanced MIMO support. A core component in LTE is the support of MIMO antenna deployments and MIMO related techniques. A current working assumption in LTE-Advanced is the support of an 8-layer spatial multiplexing mode for 8 transmit (Tx) antennas, with the possibility of channel dependent precoding. The spatial multiplexing mode provides high data rates under favorable channel conditions.

With spatial multiplexing, an information carrying symbol vector s is multiplied by an $N_T \times r$ precoder matrix $W_{N_T \times r}$, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI). The PMI value specifies a unique precoder matrix in the codebook for a given number of symbol streams.

If the precoder matrix is confined to have orthonormal columns, then the design of the codebook of precoder matrices corresponds to a Grassmannian subspace packing problem. In any case, the r symbols in the symbol vector s each correspond to a layer and r is referred to as the transmission rank. In this way, spatial multiplexing is achieved because multiple symbols can be transmitted simultaneously over the same time/frequency resource element (TFRE). The number of symbols r is typically adapted to suit the current propagation channel properties.

LTE uses OFDM in the downlink (and DFT precoded OFDM in the uplink) and hence the received $N_R \times 1$ vector $y_n$ for a certain TFRE on subcarrier n (or alternatively data TFRE number n) is thus modeled by $$y_n = H_n W_{N_T \times r} s_n + e_n \quad (1)$$

where $e_n$ is a noise/interference vector obtained as realizations of a random process. The precoder, $W_{N_T \times r}$, can be a wideband precoder, which is constant over frequency, or frequency selective.

The precoder matrix is often chosen to match the characteristics of the $N_R \times N_T$ MIMO channel matrix H, resulting in so-called channel dependent precoding. This is also commonly referred to as closed-loop precoding and essentially tries to focus the transmit energy into a subspace which is strong in the sense of conveying much of the transmitted energy to the targeted receiver, e.g., a user equipment (UE). In addition, the precoder matrix also may be selected with the goal of orthogonalizing the channel, meaning that after proper linear equalization at the UE or other targeted receiver, the inter-layer interference is reduced.

In closed-loop precoding for the LTE downlink in particular, the UE transmits, based on channel measurements in the forward link (downlink), recommendations to the eNodeB of a suitable precoder to use. A single precoder that is supposed to cover a large bandwidth (wideband precoding) may be fed back. It also may be beneficial to match the frequency variations of the channel and instead feedback a frequency-selective precoding report, e.g. several precoders, one per frequency subband. This approach is an example of the more general case of channel state information (CSI) feedback, which also encompasses feeding back entities other than precoders, to assist the eNodeB in adapting subsequent transmissions to the UE. Such other information may include channel quality indicators (CQIs) as well as a transmission rank indicator (RI).

For the LTE uplink, the use of closed-loop precoding means that the eNodeB selects precoder(s) and the transmission rank. The eNodeB thereafter signals the selected precoder that the UE is supposed to use. The eNodeB also may use certain bitmap-based signaling to indicate the particular precoders within a codebook that the UE is restricted to use. See, e.g., Section 7.2 of the 3GPP Technical Specification, TS 36.213. One disadvantage of such signaling is the use of bitmaps to indicate allowed or disallowed precoders. Codebooks with large numbers of precoders require long bitmaps, and the signaling overhead associated with transmitting long bitmaps becomes prohibitive.

In any case, the transmission rank, and thus the number of spatially multiplexed layers, is reflected in the number of columns of the precoder. Efficiency and transmission performance are improved by selecting a transmission rank that matches the current channel properties. Often, the device selecting precoders is also responsible for selecting the transmission rank. One approach to transmission rank selection involves evaluating a performance metric for each possible rank and picking the rank that optimizes the performance metric. These kinds of calculations are often computationally burdensome and it is therefore an advantage if calculations can be re-used across different transmission ranks. Re-use of calculations is facilitated by designing the precoder codebook to fulfill the so-called rank nested property. This means that the codebook is such that there always exists a column subset of a higher rank precoder that is also a valid lower rank precoder.

The 4-Tx House Holder codebook for the LTE downlink is an example of a codebook that fulfills the rank nested property. The property is not only useful for reducing computational complexity, but is also important in simplifying over-riding a rank selection at a device other than the one that has chosen the transmission rank. Consider for example the LTE downlink where the UE selects the precoder and rank, and conditioned on those choices, computes a CQI representing the quality of the effective channel formed by the selected precoder and the channel. Since the CQI thus reported by the UE is conditioned on a certain transmission rank, performing rank override at the eNodeB side makes it difficult to know how to adjust the reported CQI to take the new rank into account.

However, if the precoder codebook fulfills the rank nested property, overriding the rank to a lower rank precoder is possible by selecting a column subset of the original precoder. Since the new precoder is a column subset of the original precoder, the CQI tied to the original precoder gives a lower bound on the CQI if the new reduced rank precoder is used. Such bounds can be exploited for reducing the CQI errors associated with rank override, thereby improving the performance of the link adaptation.

Another issue to take into account when designing precoders is to ensure an efficient use of the transmitter's power amplifiers (PAs). Usually, power cannot be borrowed across antennas because, in general, there is a separate PA for each antenna. Hence, for maximum use of the PA resources, it is important that the same amount of power is transmitted from each antenna, i.e., a precoder matrix W should fulfill $$[WW^*]_{mm} = \kappa, \forall m \quad (2)$$

Thus, it is beneficial from a PA utilization point of view to enforce this constraint when designing precoder codebooks.

Full power utilization is also ensured by the so-called constant modulus property, which means that all scalar elements in a precoder have the same norm (modulus). It is easily verified that a constant modulus precoder also fulfills the full PA utilization constraint in (2) and hence the constant modulus property constitutes a sufficient but not necessary condition for full PA utilization.

As a further aspect of the LTE downlink and associated transmitter adaptation, the UE reports CQI and precoders to the eNodeB via a feedback channel. The feedback channel is either on the Physical Uplink Control Channel (PUCCH) or on the Physical Uplink Shared Channel (PUSCH). The former is a rather narrow bit pipe where CSI feedback is reported in a semi-statically configured and periodic fashion. On the other hand, reporting on PUSCH is dynamically triggered as part of the uplink grant. Thus, the eNodeB can schedule CSI transmissions in a dynamic fashion. Further, in contrast to CSI reporting on PUCCH, where the number of physical bits is currently limited to 20, CSI reports on PUSCH can be considerably larger. Such a division of resources makes sense from the perspective that semi-statically configured resources such as PUCCH cannot adapt to quickly changing traffic conditions, thus making it important to limit their overall resource consumption.

More generally, maintaining low signaling overhead remains an important design target in wireless systems. In this regard, precoder signaling can easily consume a large portion of the available resources unless the signaling protocol is carefully designed. The structure of possible precoders and the overall design of the precoder codebook plays an important role in keeping the signaling overhead low. A particularly promising precoder structure involves decomposing the precoder into two matrices, a so-called factorized precoder. The precoder can then be written as a product of two factors $$W_{N_T \times r} = W_{N_T \times k}^{(c)} W_{k \times r}^{(t)}, \quad (3)$$

where an $N_T \times k$ conversion precoder $W_{N_T \times k}$ strives for capturing wideband/long-term properties of the channel such as correlation, while a $k \times r$ tuning precoder $W_{k \times r}^{(t)}$ targets frequency-selective/short-term properties of the channel.

Together, the factorized conversion and tuning precoders represent the overall precoder $W_{N_T \times r}$, which is induced by the signaled entities. The conversion precoder is typically, but not necessarily, reported with a coarser granularity in time and/or frequency than the tuning precoder to save overhead and/or complexity. The conversion precoder serves to exploit the correlation properties for focusing the tuning precoder in "directions" where the propagation channel on average is "strong." Typically, this is accomplished by reducing the number of dimensions k covered by the tuning precoder. In other words, the conversion precoder $W_{N_T \times k}^{(c)}$ becomes a tall matrix with a reduced number of columns. Consequently, the number of rows k of the tuning precoder $W_{k \times r}^{(t)}$ is reduced as well. With such a reduced number of dimensions, the codebook for the tuning precoder, which easily consumes most of the signaling resources since it needs to be updated with fine granularity, can be made smaller while still maintaining good performance.

The conversion and the tuning precoders may each have a codebook of their own. The conversion precoder targets having high spatial resolution and thus a codebook with many elements, while the codebook the tuning precoder is selected from needs to be rather small in order to keep the signaling overhead at a reasonable level.

To see how correlation properties are exploited and dimension reduction achieved, consider the common case of an array with a total of $N_T$ elements arranged into $N_T/2$ closely spaced cross-poles. Based on the polarization direction of the antennas, the antennas in the closely spaced cross-pole setup can be divided into two groups, where each group is a closely spaced co-polarized Uniform Linear Array (ULA) with $N_T/2$ antennas. Closely spaced antennas often lead to high channel correlation and the correlation can in turn be exploited to maintain low signalling overhead. The channels corresponding to each such antenna group ULA are denoted $H_/$ and $H_\backslash$, respectively. For convenience in notation, the following equations drop the subscripts indicating the dimensions of the matrices as well as the subscript n. Assuming now that the conversion precoder $W^{(c)}$ has a block diagonal structure, $$W^{(c)} = \begin{bmatrix} \tilde{W}^{(c)} & 0 \\ 0 & \tilde{W}^{(c)} \end{bmatrix}. \quad (4)$$

The product of the MIMO channel and the overall precoder can then be written as $$\begin{aligned} HW &= [H_/ \quad H_\backslash] W^{(c)} W^{(t)} \\ &= [H_/ \quad H_\backslash] \begin{bmatrix} \tilde{W}^{(c)} & 0 \\ 0 & \tilde{W}^{(c)} \end{bmatrix} W^{(t)} \\ &= [H_/ \tilde{W}^{(c)} \quad H_\backslash \tilde{W}^{(c)}] W^{(t)} \\ &= H_{\text{eff}} W^{(t)}. \end{aligned} \quad (5)$$

As seen, the matrix $\tilde{W}^{(c)}$ separately precodes each antenna group ULA, thereby forming a smaller and improved effective channel $H_{\text{eff}}$. As such, $W^{(c)}$ is sometimes referred to as an "antenna subgroup" precoder. If $\tilde{W}^{(c)}$ corresponds to a beamforming vector, the effective channel would reduce to having only two virtual antennas, which reduces the needed size of the codebook used for the second tuning precoder matrix $W^{(t)}$ when tracking the instantaneous channel properties. In this case, instantaneous channel properties are to a large extent dependent upon the relative phase relation between the two orthogonal polarizations.

It is also helpful for a fuller understanding of this disclosure to consider the theory regarding a "grid of beams," along with Discrete Fourier Transform (DFT) based precoding. DFT based precoder vectors for $N_T$ transmit antennas can be written in the form $$w_n^{(N_T,Q)} = [\, w_{1,n}^{(N_T,Q)} \quad w_{2,n}^{(N_T,Q)} \quad \ldots \quad w_{N_T,n}^{(N_T,Q)} \,]^T \quad (6)$$

$$w_{m,n}^{(N_T,Q)} = \exp\left(j\frac{2\pi}{N_T Q}mn\right),$$

$$m = 0, \ldots, N_T - 1, n = 0, \ldots, QN_T - 1,$$

where $w_{m,n}^{(N_T,Q)}$ is the phase of the m:th antenna, n is the precoder vector index (i.e., which beam out of the $QN_T$ beams) and Q is the oversampling factor.

For good performance, it is important that the array gain function of two consecutive beams overlaps in the angular domain, so that the gain does not drop too much when going from one beam to another. Usually, this requires an oversampling factor of at least Q=2. Thus for $N_T$ antennas, at least $2N_T$ beams are needed.

An alternative parameterization of the above DFT based precoder vectors is $$w_{l,q}^{(N_T,Q)} = [\, w_{1,Ql+q}^{(N_T,Q)} \quad w_{2,Ql+q}^{(N_T,Q)} \quad \ldots \quad w_{N_T,Ql+q}^{(N_T,Q)} \,]^T \quad (7)$$

$$w_{m,Ql+q}^{(N_T,Q)} = \exp\left(j\frac{2\pi}{N_T}m\left(l + \frac{q}{Q}\right)\right),$$

for m=0, ..., $N_T$-1, l=0, ..., $N_T$-1, q=0, 1, ..., Q-1, and where l and q together determine the precoder vector index via the relation n=Ql+q. This parameterization also highlights that there are Q groups of beams, where the beams within each group are orthogonal to each other. The q:th group can be represented by the generator matrix $$G_q^{(N_T)} = [\, w_{0,q}^{(N_T,Q)} \quad w_{1,q}^{(N_T,Q)} \quad \ldots \quad w_{N_T-1,q}^{(N_T,Q)} \,]. \quad (8)$$

By insuring that only precoder vectors from the same generator matrix are being used together as columns in the same precoder, it is straightforward to form sets of precoder vectors for use in so-called unitary precoding where the columns within a precoder matrix should form an orthonormal set.

Further, to maximize the performance of DFT based precoding, it is useful to center the grid of beams symmetrically around the broad size of the array. Such rotation of the beams can be done by multiplying from the left the above DFT vectors $w_n^{(N_T,Q)}$ with a diagonal matrix $W_{rot}$ having elements $$[W_{rot}]_{mn} = \exp\left(j\frac{\pi}{QN_T}m\right). \quad (9)$$

The rotation can either be included in the precoder codebook or alternatively be carried out as a separate step where all signals are rotated in the same manner and the rotation can thus be absorbed into the channel from the perspective of the receiver (transparent to the receiver). Henceforth, in discussing DFT precoding herein, it is tacitly assumed that rotation may or may not have been carried out. That is, both alternatives are possible without explicitly having to mention it.

One aspect of the above-described factorized precoder structure relates to lowering the overhead associated with signaling the precoders, based on signaling the conversion and the tuning precoders $W^{(c)}$ and $W^{(t)}$ with different frequency and/or time granularity. The use of a block diagonal conversion precoder is specifically optimized for the case of a transmit antenna array consisting of closely spaced crosspoles, but other antenna arrangements exist as well. In particular, efficient performance with a ULA of closely spaced co-poles should also be achieved. However, the method for achieving efficient performance in this regard is not obvious, with respect to a block diagonal conversion precoder structure.

Another aspect to consider is that, in a general sense, the above-described factorized precoder feedback may prevent full PA utilization, and may violate the aforementioned rank nested property. These issues arise from the fact that the two factorized precoders—i.e., the conversion precoder and the tuning precoder—are multiplied together to form the overall precoder and thus the normal rules for ensuring full PA utilization and rank nested property by means of constant modulus and column subset precoders, respectively, do not apply.

Further precoding considerations, particularly in the context of the LTE downlink, include the fact that the PUCCH cannot bear as large a payload size as the PUSCH, for the previously described reasons. Thus, there is a risk of "coverage" problems when a UE reports CSI on the PUCCH. In this regard, it is useful to understand that current precoder designs commonly are optimized for transmissions to/from a single UE. In the MIMO context, this single-user context is referred to as a Single User MIMO or SU-MIMO. Conversely, co-scheduling multiple UEs on the same time/frequency resources is called Multi User MIMO or MU-MIMO. MU-MIMO is gaining increasing interest, but it imposes different requirements on precoder reporting and the underlying precoder structures.

SUMMARY

One aspect of the teachings presented herein relates to sending precoder selection feedback from a second transceiver to a first transceiver, for use by the first transceiver as precoding recommendations. In particular, the second transceiver generates two types of precoder selection feedback, where one type uses a smaller signaling payload than the other type and therefore provides a distinct reduction in the signaling overhead associated with reporting precoding recommendations to the first transceiver. As an example, the second transceiver sends precoding recommendations using the reduced-overhead type of reporting when reporting at certain times, or when reporting on certain channels, or in response to received control signaling. The smaller-payload signaling comprises, for example, restricted-smaller-range index values that index a subset of precoders within a larger set, while the larger-payload signaling comprises full-range index values that index the larger set. The restricted-range index values are also referred to as "smaller-range" index values, to emphasize that they can only index a smaller range of precoders within the larger set.

As a particularly advantageous but still non-limiting example the first and second transceivers are configured for operation in a wireless communication network operating in accordance with the 3GPP LTE standards—e.g., the first transceiver is a eNB in the network and the second transceiver is a mobile terminal or other item of user equipment (UE). Here, the second transceiver indicates its precoding recommendations by sending index values as the precoder selection feedback, where each index value "points" to one or more precoders in a predefined codebook. When reporting precoder selection feedback on the Physical Uplink Shared Channel (PUSCH), the second transceiver sends full-range index values that span a predetermined set of precoders, e.g., an entire codebook. However, when reporting precoder selection feedback on the Physical Uplink Control Channel (PUCCH), the second transceiver sends smaller-range index values. While the smaller-range index values cover only a subset of the precoders in the predetermined set, they are advantageously reported using a smaller payload than used for reporting the full-range index values. That is, the smaller-range index values are capable of indexing only a portion of the full set of precoders, while the full-range index values are capable of indexing across the full set of precoders.

With that example in mind, the teachings herein broadly provide a method in a second wireless communication transceiver of providing precoder selection feedback to a first wireless communication transceiver, as precoding recommendations for the first transceiver. Here, the terms "first transceiver" and "second transceiver" denote, as a non-limiting example, a wireless network base station operating as the first transceiver and an item of user equipment (UE) operating as the second transceiver, wherein the base station precodes certain transmissions to the UE, based at least in part on receiving precoder selection feedback from the UE, indicating the UE's precoder recommendations.

In any case, the method includes determining channel conditions at the second transceiver, and when operating in a first feedback mode, selecting a precoder from a predetermined set of precoders based on said channel conditions, and sending a full-range index value for the selected precoder to the first transceiver as the precoder selection feedback. However, when operating in a second feedback mode, the method includes the second transceiver selecting a precoder from a smaller, predetermined subset of precoders contained within the predetermined set of precoders based on the channel conditions, and sending a smaller-range index value for the selected precoder to said first transceiver as the precoder selection feedback. Here, the second transceiver uses a smaller signaling payload for sending smaller-range index values, as compared to the signaling payload used to send full-range index values.

In at least one embodiment, the second transceiver sends the precoder selection feedback at certain first times on a control channel and at certain second times on a data channel. The method further includes the second transceiver selecting the first feedback mode when sending the precoder selection feedback multiplexed with data on the same physical channel. Conversely, the second transceiver selects the second feedback mode when sending the precoder selection feedback on the control channel. Correspondingly, the first transceiver is advantageously configured to receive and use (e.g., recognize and respond to) both types of feedback.

In a related embodiment, the teachings herein provide example details for a wireless communication transceiver that is configured to provide precoder selection feedback to another wireless communication transceiver, as precoding recommendations for that other transceiver. The transceiver includes a receiver configured to receive signals from said other transceiver and a channel estimator configured to estimate channel conditions at the transceiver with respect to signals received from the other transceiver. The transceiver further includes a transmitter configured to transmit signals to the other transceiver, including signals conveying the precoder selection feedback. Additionally, the transceiver includes a precoding feedback generator that is configured to determine whether to operate in a first feedback mode or a second feedback mode.

When operating in the first feedback mode, the precoding feedback generator is configured to select a precoder from a predetermined set of precoders based on the channel conditions and send a full-range index value for the selected precoder to the other transceiver, as the precoder selection feedback. When operating in the second feedback mode, the precoding feedback generator is configured to select a precoder from a predetermined subset of precoders contained in the predetermined set of precoders. That selection is also based on the channel conditions, but here the second transceiver sends a smaller-range index value for the selected precoder to the other transceiver. In particular, the precoding feedback generator is configured to use a smaller signaling payload for sending smaller-range index values as compared to the signaling payload used to send full-range index values. As a working example, the smaller-range index values can only point precoders in a particular subset or subsets of precoders within one or more codebooks, while the full-range index values can point to any of the precoders within the codebook(s).

As regards the first transceiver, which may be, for example, a network base station that implements transmit precoding, the teachings herein disclose a method wherein the first transceiver receives precoding recommendations from the second transceiver, in the form of precoder selection feedback. The method includes receiving precoder selection feedback from the second transceiver and determining whether the precoder selection feedback comprises a first type of precoder selection feedback including a full-range index value, or a second type of precoder selection feedback including a smaller-range index value that is signaled by the second transceiver using a lower signaling overhead as compared to that used for signaling full-range index values.

According to this method, if the precoder selection feedback is the first type of precoder selection feedback, the first transceiver identifies the precoder recommendation by identifying a precoder from a predetermined set of precoders that is indexed by the full-range index value included in the precoder selection feedback. On the other hand, if the precoder selection feedback is of the second type, the first transceiver identifies the precoder recommendation by identifying a precoder from a predetermined subset of precoders that is indexed by the smaller-range index value included in the precoder selection feedback. Here, the predetermined subset is contained within the predetermined subset and comprises, by way of example, every K:th entry in the predetermined set, where K is some integer value. In any case, the method continues with the first transceiver determining a precoding operation for precoding a transmission to the second transceiver based at least in part on the precoder recommendation.

BRIEF DESCRIPTION OF THE DRAWINGS

FIG. 2 is a diagram of one embodiment of a predetermined set of precoders having a logical subset defined within it.

FIGS. 3 and 4 are diagrams of one embodiment of full-range and smaller-range index values, for use in indexing all or a subset of the predetermined set of precoders shown in FIG. 3.

DETAILED DESCRIPTION

Figure 1:
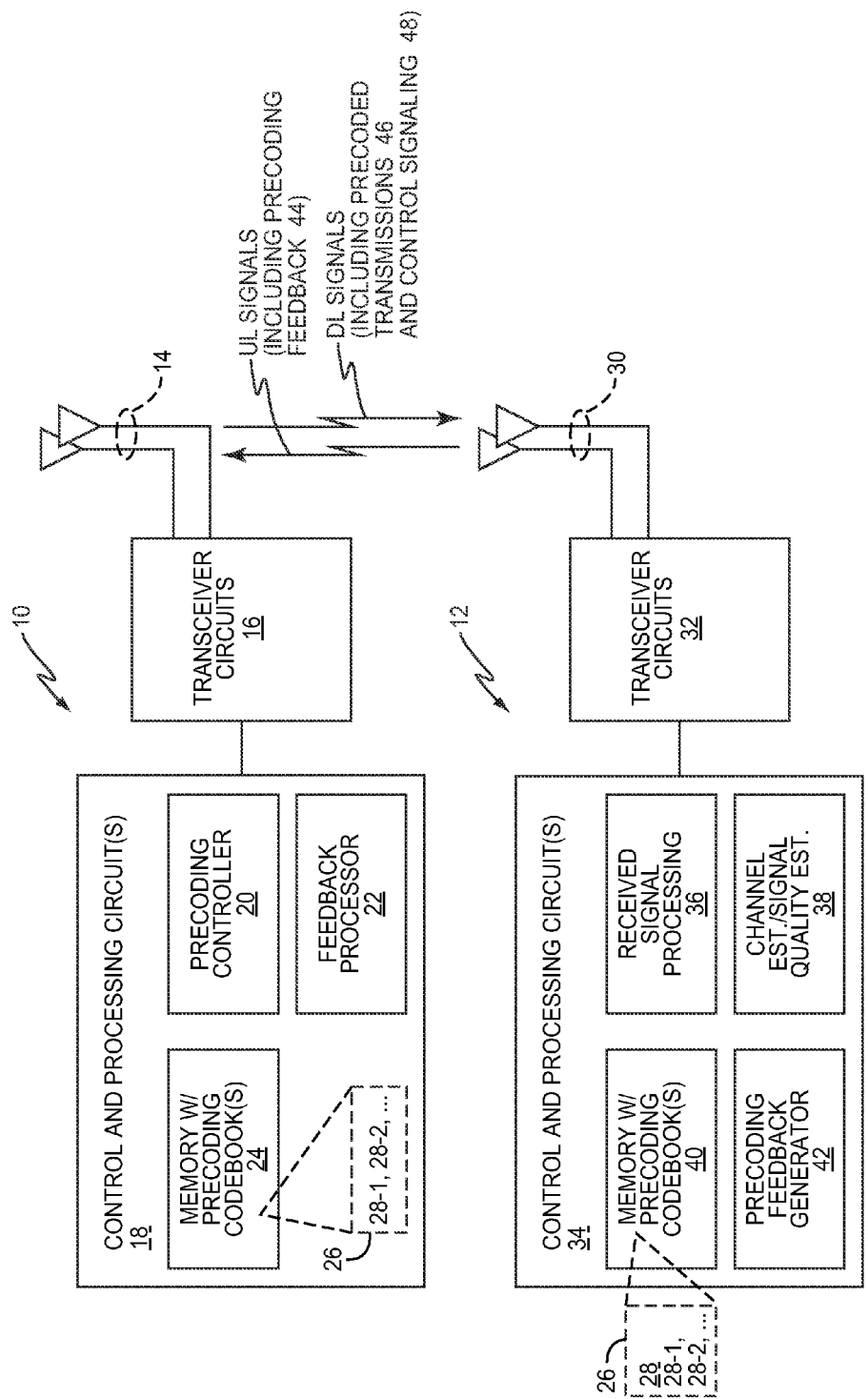
FIG. 1 is a block diagram of example embodiments of a first transceiver that is configured to transmit precoded transmissions to a second transceiver.

FIG. 1 depicts a first wireless communication transceiver 10 and a second wireless communication transceiver 12, referred to for convenience as transceivers 10 and 12. The transceiver 10 includes a number of antennas 14 and associated transceiver circuits 16 (including one or more radiofrequency receivers and transmitters), along with control and processing circuits 18. At least functionally, the control and processing circuits 18 include a precoding controller 20, a feedback processor 22, and one or more memory circuits 24 that store a codebook 26 of precoders 28. While the number "28" is used generally as a reference in both the singular and plural senses, for referring to one or multiple precoders 28, suffix designations are used, where helpful for clarity, e.g., precoder 28-1, precoder 28-2, and so on.

The second transceiver 12 includes a number of antennas 30 and associated transceiver circuits 32 (including one or more radio frequency receivers and transmitters), along with control and processing circuits 34. At least functionally, the control and processing circuits 34 include received signal processing circuitry 36, e.g., demodulation/decoding circuits, and further include one or more estimation circuits 38, for estimating channel conditions and/or signal quality.

Further, the control and processing circuits 34 include one or more memory circuits 40, and a precoding feedback generator 42. The memory circuit(s) 40 store, for example, the same codebook 26 of precoders 28 as stored at the transceiver 10. In this manner, the transceiver 12 can send precoder selection feedback 44 to the transceiver 10 by sending (Precoder Matrix Index) PMI values. The PMI values indicate the codebook index value of the precoder(s) 28 selected by the transceiver 12, as recommended for use by the transceiver 10 in applying a precoding operation at the transceiver 10. That is, in simple terms, the precoder selection feedback 44 can be understood as the second transceiver 12 providing dynamically changing precoder recommendations to the first transceiver 10, according to changing channel conditions, etc. The transceiver 10 considers this precoder information from the second transceiver 12 in determining the precoding operation it applies in precoding the transmissions 46 sent from the first transceiver 10 to the second transceiver 12. Also, in one or more embodiments, the transceiver 10 sends control signaling 48 to the transceiver 12, to control its precoding recommendations.

In at least one embodiment, the control and processing circuits 18 of the transceiver 10 at least in part comprise computer-based circuitry, e.g., one or more microprocessors and/or digital signals processors, or other digital processing circuitry. In at least one embodiment, such circuitry is specially configured to implement the methods taught herein for the transceiver 10, based on executing stored computer program instructions, such as may be stored in the memory circuit(s) 24. Likewise, in at least one embodiment, the control and processing circuits 34 are implemented at least in part via programmable digital processing circuitry. For example, the control and processing circuits 34 in one or more embodiments include one or more microprocessors or digital signal processors configured to implement at least a portion of the methods taught herein for the transceiver 12, based on executing computer program instructions stored in the one or more memory circuits 40.

With these example implementation details in mind, in one or more embodiments, the transceiver 12 is configured to provide precoder selection feedback 44 to the transceiver 10, as precoding recommendations to the transceiver 10. In support of this configuration, the transceiver 12 includes a receiver (within the transceiver circuits 16) that is configured to receive signals from the transceiver 10. The transceiver 12 further includes the channel estimator 38, which here is configured to estimate channel conditions at the transceiver 12, with respect to signals received from the transceiver 10. Still further, the transceiver 12 includes a transmitter (within the transceiver circuits 16) that is configured to transmit signals to the transceiver 10, including signals conveying the precoder selection feedback 44.

Additionally, the transceiver 12 includes the previously mentioned precoding feedback generator 42, which is configured to operate in either of first and second feedback modes. With reference to FIG. 2, one sees a predetermined set 50 of precoders 28, which are indexed by a full-range index value 52. As an example, the predetermined set 50 of precoders 28 represents all of the precoders 28 in the codebook 26 shown in FIG. 1. Of course, that example is non-limiting; the predetermined set 50 of precoders 28 itself may be a subset within a larger set of precoders 28, and one may extend this idea to multiple codebooks 26. Further, the precoders 28 are not necessarily all the same—e.g., there may be different subsets of precoders 28 for the factorized precoder discussed earlier and/or for different operating conditions or modes.

In any case, FIG. 2 further depicts at least one predetermined subset 54 of precoders 28 that are indexed by a smaller-range index value 56. It will be understood that the predetermined subset 54 of precoders 28 is a defined subset of precoders 28 in the larger set 50 of precoders 28. As a non-limiting example, assume that the set 50 of precoders 28 includes sixteen values indexed as $\{0, 1, 2, \ldots, 15\}$. Further, assume that the subset 54 of precoders 28 corresponds to a subset of eight of those sixteen precoders and specifically corresponds to those precoders 28 at index positions $\{0, 2, 4, 6, \ldots, 14\}$ within the larger set 50. For this example, subset selections can be signaled using a renumbered index range $\{0, 1, 2, \ldots, 7\}$, which indicates selections from the $\{0, 2, 4, 6, \ldots, 14\}$ subset 54 within the larger $\{0, 1, 2, \ldots, 15\}$ set 50. Thus, the smaller-range index value 56 need only span the renumbered index values $\{0, 1, \ldots, 7\}$.

In one example, the predetermined set 50 of precoders 28 includes a number of DFT-based precoders representing a total of N DFT-based beams for transmission beamforming (at the transceiver 10). Correspondingly, the predetermined subset 54 of precoders 28 represents a total of M DFT-based beams for transmission beamforming and corresponds to every R-th one of the N DFT-based beams. Here, N, M, and R are integer values and M<N.

In at least one such embodiment, at least some of the precoders 28 in the predetermined set 50 of precoders are based on a factorized precoder design comprising a conversion precoder and a tuning precoder. For example, the DFT-based precoders in the predetermined set 50 of precoders 28 are each formed as the combination of a selected conversion precoder and a selected tuning precoder. Thus, such precoders 28 in the predetermined set 50 of precoders 28 correspond to a set of N different conversion precoders and a set of tuning precoders. Each said conversion precoder comprises a block diagonal matrix in which each block comprises a DFT-based precoder that defines N different DFT-based beams for a subgroup in a group of $N_T$ transmit antenna ports at the first transceiver (10), and the predetermined subset of precoders represents every R-th one of said N DFT-based beams.

In another example, the set 50 of precoders 28 represents thirty-two (32) DFT-based beams—i.e., N=32. The subset 54 of precoders 28 represents a subset of eight of those beams—i.e., M=8. Thus, the subset-based precoding keeps only eight of the thirty-two beams for antenna subgroup precoding. Moreover, for precoding with the subset of eight beams, it is contemplated herein to down-sample the QPSK-alphabet phase adjustment between the antenna subgroups to a BPSK alphabet (+−1). More generally, with N beams in the set 50, a subset M of those beams can be formed by taking every R-th one of the N beams, where M, N, and R are integers and M<N. The phase resolution that defines the beam phase offsets is correspondingly adjusted when switching from the subset 50 of N precoders 28 corresponding to N DFT-based beams to the subset 54 of M precoders 28 corresponding to M DFT-based beams.

Advantageously, because the "index space" spanned by the smaller-range index value 56 is smaller than that of the full-range index value 52, the smaller-range index value 56 can be represented by fewer information bits than are needed to represent the full-range index value 52. See FIGS. 3 and 4 for example illustrations, showing "X" bits representing the full-range index value 52 and "Y" bits representing the smaller-range index value 56, where Y<X.

With the above details in mind, the precoding feedback generator 42 at the transceiver 12 is configured to determine whether to operate in a first feedback mode, or in a second feedback mode. In the first feedback mode, the precoder selection feedback 44 is generated using full-range index values 52, while in the second feedback mode, the precoder selection feedback 44 is generated using smaller-range values 56. Sending the precoder selection feedback 44 thus requires a lower signaling overhead when the precoding feedback generator 42 is operating in the second feedback mode.

The precoding feedback generator 42 is configured to determine which one of the two modes it operates in based on, for example, which physical transmission channel is being used to transmit the precoding selection feedback 44 and/or based on control signaling 48 received from the first transceiver 10.

In any case, the precoding feedback generator 42 is configured such that, when operating in the first feedback mode, it selects a precoder 28 from the predetermined set 50 of precoders 28 based on the channel conditions and sends a full-range index value 52 for the selected precoder 28 to the transceiver 10. When operating in the second feedback mode, the precoding feedback generator 42 is configured to select its precoding recommendations from the predetermined subset 54 of precoders 28 contained in the predetermined set 50 of precoders 28 based on said channel conditions, and to send a smaller-range index value 56, for the selected precoder 28 to the transceiver 10 as the precoder selection feedback 44. As such, the transceiver 12 advantageously uses a smaller signaling payload for sending smaller-range index values 56 as compared to the signaling payload used to send full-range index values 52. For example, the full-range index value 52 might be defined as an eight-bit value, while the smaller-range index value 56 might be defined as a four- or five-bit value.

Figure 5:
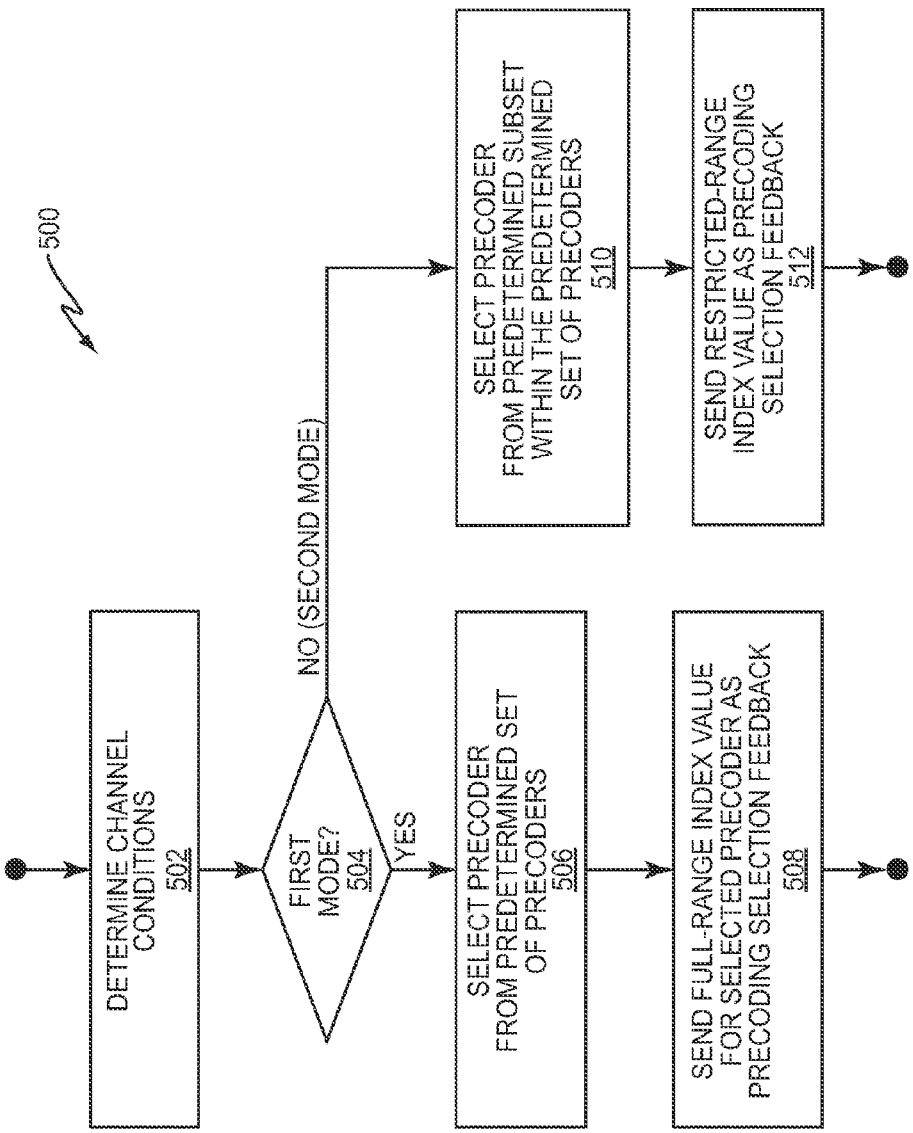
FIG. 5 is a logic flow diagram of one embodiment of a method for sending precoder selection feedback from one transceiver to another transceiver, where the precoder selection feedback transmitted uses a varying payload size to signal the recommendations.

FIG. 5 illustrates one example of a method corresponding to the above processing, where the illustrated method 500 is carried out at the second transceiver 12 and provides precoder selection feedback 44, as precoding recommendations from the transceiver 12 to the transceiver 10. The method 500 includes determining channel conditions at the transceiver 12 (Block 502). Those of ordinary skill in the art will appreciate, for example, that the transceiver 12 measures channel conditions dynamically with respect to signals received from the transceiver 10, and assesses those channel conditions as a basis for making precoder recommendations to the transceiver 10. Further, it will be understood that the precoder selection feedback 44 may be sent as information within a Channel State Information (CSI) report, which may include additional information about reception conditions at the transceiver 12.

The method 500 continues with determining whether the transceiver 12 is operating in the first feedback mode or in the second feedback mode (Block 504). If the transceiver 12 is operating in the first feedback mode, the method 500 continues with the transceiver 12 selecting a precoder 28 from the predetermined set 50 of precoders 28, as illustrated in FIG. 2, where that selection is based on the channel conditions (Block 506). From there, the method 500 continues with sending the full-range index value 52 for the selected precoder 28 to the transceiver 10 as the precoder selection feedback 44 (Block 508).

If the transceiver 12 is operating in the second feedback mode (NO from Block 504), then the method includes selecting a precoder 28 from the smaller, predetermined subset 54 of precoders 28, which is contained within the predetermined set 50 of precoders 28 (Block 510). From there, the method 500 continues with sending a smaller-range index value 56 for the selected precoder 28 to the transceiver 10 as the precoder selection feedback 44 (Block 512). This signaling is done using a smaller signaling payload than used for sending the full-range index value 52.

In at least one embodiment of the method 500, the transceiver 12 sends the precoder selection feedback 44 at certain first times on a control channel and at certain second times on a data channel. In particular, in at least one embodiment, the method 500 includes selecting the first feedback mode when sending the precoder selection feedback 44 multiplexed with data on the same physical channel and selecting said second feedback mode when sending the precoder selection feedback 44 on the control channel. As one example of this case, the transceivers 10 and 12 operate in accordance with 3GPP Long Term Evolution (LTE) air interface standards. For example, the transceiver 10 is an eNodeB in an LTE network and the transceiver 12 is a mobile terminal or other item of user equipment (UE). The control channel in this context comprises the LTE Physical Uplink Control Channel (PUCCH) and the data channel comprises the LTE Physical Uplink Shared Channel (PUSCH). The transceiver 12 can send the precoder selection feedback 44 as control information on the PUCCH, e.g., while operating in the second mode, and can send the precoder selection feedback 44 multiplexed with data on the PUSCH, e.g., when operating in the first mode.

Additionally, in at least one embodiment of the method 500, using a smaller signaling payload for sending smaller-range index values 56, as compared to the signaling payload used to send full-range index values comprises using a smaller number of bits to represent the smaller-range index values as compared to the number of bits used to represent the full-range index values. For example, with momentary reference to FIGS. 3 and 4, the full-range index values 52 are represented by X information bits, while the smaller-range index values 56 are represented by Y information bits, where Y<X.

Further, in at least one embodiment of the method 500, the transceiver 12 dynamically selects either the first or the second feedback modes responsive to receiving control signaling from the transceiver 10. In the same or another embodiment, the transceiver 12 is configured to select the second feedback mode when sending precoder selection feedback 44 as an unscheduled transmission, and to select the first feedback mode when sending precoder selection feedback 44 as a scheduled transmission.

Further, in at least one embodiment of the method 500, the predetermined set 50 of precoders 28 comprises a predetermined set of DFT-based precoders providing a first spatial resolution for beam forming at the transceiver 10. Here, the predetermined subset 54 of precoders 28 contained within the predetermined set 50 comprises a subset of the same DFT-based precoders providing a second spatial resolution for the beam forming at the transceiver 10. The second spatial resolution is lower than the first spatial resolution. With this arrangement, the second transceiver 12 provides higher-resolution beam forming feedback to the transceiver 10 when the second transceiver 12 operates in the first feedback mode, at the expense of signaling overhead. Conversely, the transceiver 12 provides lower-resolution beam forming feedback to the transceiver 10 when the transceiver 12 operates in the second feedback mode, with the advantage of signaling that lower-resolution feedback at a lower signaling overhead. Another point to note with this example, and in a larger sense with respect to the teachings herein, is that the predetermined subset 54 of precoders 28 may be optimized or designed for particular transmission modes or operating scenarios, as compared to at least certain other ones of the precoders 28 in the predetermined set 50 of precoders 28.

In at least one embodiment, the predetermined set 50 of precoders 28 comprises N precoders 28, wherein N is an integer value, and the predetermined subset 54 of precoders 28 comprises M of the N precoders, wherein M is an integer value less than N. In particular, in at least one such embodiment, the M precoders are selected from the N precoders to minimize distances on a Grassmanian manifold between the M precoders.

Figure 6:
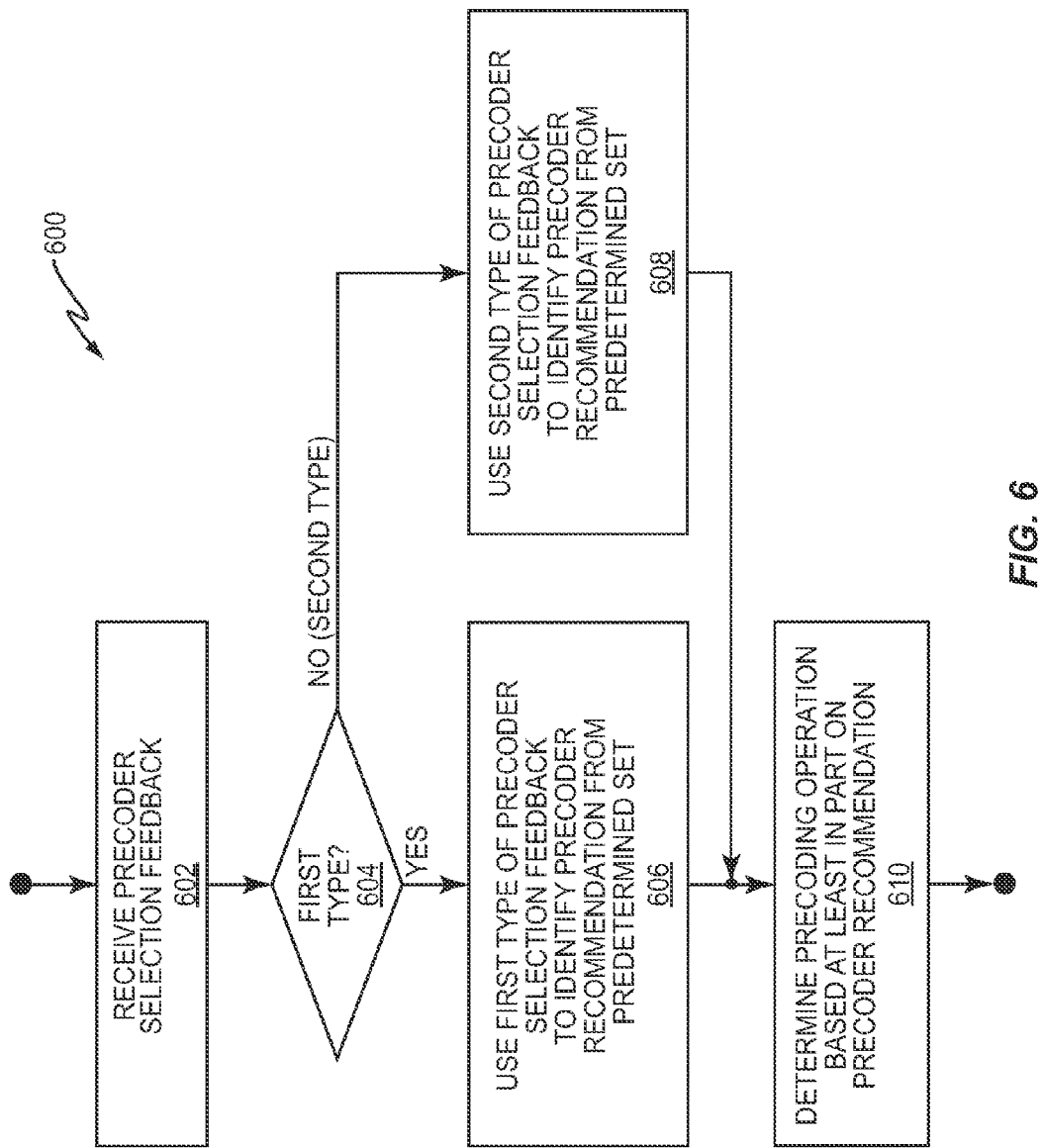
FIG. 6 is a logic flow diagram of one embodiment of a method for receiving and processing precoder selection feedback that includes a variable payload size for signaled precoder information.

FIG. 6, with its illustration of an example method 600 performed at the transceiver 10 turns the discussion toward the complementary operations happening at that node. That is, it will be understood that the transceiver 10 is configured to advantageously receive and process (interpret and respond to) the precoding feedback 44 regardless of whether it includes full-range index values 52 or smaller-range index values 56. In this regard, it will be understood that the feedback processor 22 of the transceiver 10, as shown in FIG. 1, is particularly configured to process both full-range and smaller-range index values 52 and 56.

The method 600 involves the transceiver 10 determining a precoder recommendation from the second transceiver 12, and it will be understood that this method may be carried out repeatedly, such as whenever a new CSI report is received from the transceiver 12. With that in mind, the method 600 includes receiving precoder selection feedback 44 from the transceiver 12 (Block 602), and determining whether the precoder selection feedback 44 comprises a first type of precoder selection feedback including a full-range index value 52, or a second type of precoder selection feedback including a smaller-range index value 54 (Block 604). Note that smaller-range index values 56 are signaled by the second transceiver 12 using a lower signaling overhead as compared to that used for signaling full-range index values 52.

If the precoder selection feedback 44 is of the first type, the method 600 continues with identifying the precoder recommendation by identifying a precoder 28 from a predetermined set 50 of precoders 28, as indexed by the full-range index value 52 (Block 606). On the other hand, if the precoder selection feedback 44 is of the second type, the method 600 continues with identifying the precoder recommendation by identifying a precoder 28 from a predetermined subset 54 of precoders 28, where that subset 54 is indexed by the smaller-range index value 56 (Block 608). Further, the method 600 includes determining a precoding operation for precoding a transmission 46 to the transceiver 12, based at least in part on the precoder recommendation (Block 610). In this sense, it will be understood that the transceiver 10 may consider a number of parameters when determining the precoding to use for transmitting to the transceiver 12. For example, the transceiver 10 is a MIMO base station supporting a plurality of transceivers 12 (e.g., a plurality of UEs), and it determines precoding based on whether it is operating in SU-MIMO or MU-MIMO modes and/or based on other considerations, including scheduling load, channel conditions, etc.

In at least one embodiment, the transceiver 10 receives the first type of precoder selection feedback on a data channel and receives the second type of precoder selection feedback on a control channel. In the example noted earlier, the transceivers 10 and 12 operate in accordance with LTE air interface standards, and the control channel comprises the PUCCH, and the data channel comprises the PUSCH.

Additionally, or alternatively, in at least one embodiment, the transceiver 10 sends control signaling 48 to the transceiver 12 to control whether the transceiver 12 sends the first type or the second type of precoder selection feedback.

In the same or another embodiment, the predetermined set 50 of precoders 28 comprises a predetermined set of DFT-based precoders providing a first spatial resolution for beam forming at the transceiver 10. Further, the predetermined subset 54 of precoders 28 contained within the predetermined set 50 comprises a subset of the same DFT-based precoders providing a second spatial resolution for beam forming at the transceiver 10, with the second spatial resolution being lower than the first spatial resolution.

As a more general example, the predetermined set 50 of precoders 28 comprises N precoders, wherein N is an integer value, and the predetermined subset 54 of precoders 28 comprises M of the N precoders, wherein M is an integer value less than N. In at least one case, the M precoders are selected from the N precoders to minimize distances on a Grassmanian manifold between the M precoders.

With respect to the method 600 of FIG. 6 and the example functional circuit details of FIG. 1, it will be appreciated that, in one or more embodiments, the transceiver 10 includes a receiver that is configured to receive the precoder selection feedback 44 from the transceiver 12. For example, the transceiver 16 includes a plurality of radiofrequency receivers and transmitters, for communicating with a plurality of transceivers 12. Further, the transceiver 10 includes a feedback processor 22 configured to determine whether the precoder selection feedback 44 comprises a first type of precoder selection feedback including a full-range index value 52, or a second type of precoder selection feedback including a smaller-range index value 56 that is signaled by the second transceiver 12 using a lower signaling overhead as compared to that used for signaling full-range index values.

In the case that the precoder selection feedback 44 is of the first type, the feedback processor 22 is configured to identify the precoder recommendation by identifying a precoder 28 from the predetermined set 50 of precoders 28 indexed by the full-range index value 52 included in the precoder selection feedback 44. In the case that the feedback is of the second type, the feedback processor is configured to identify the precoder recommendation by identifying a precoder 28 from a predetermined subset 54 of precoders 28 indexed by the smaller-range index value 56.

Figure 7:
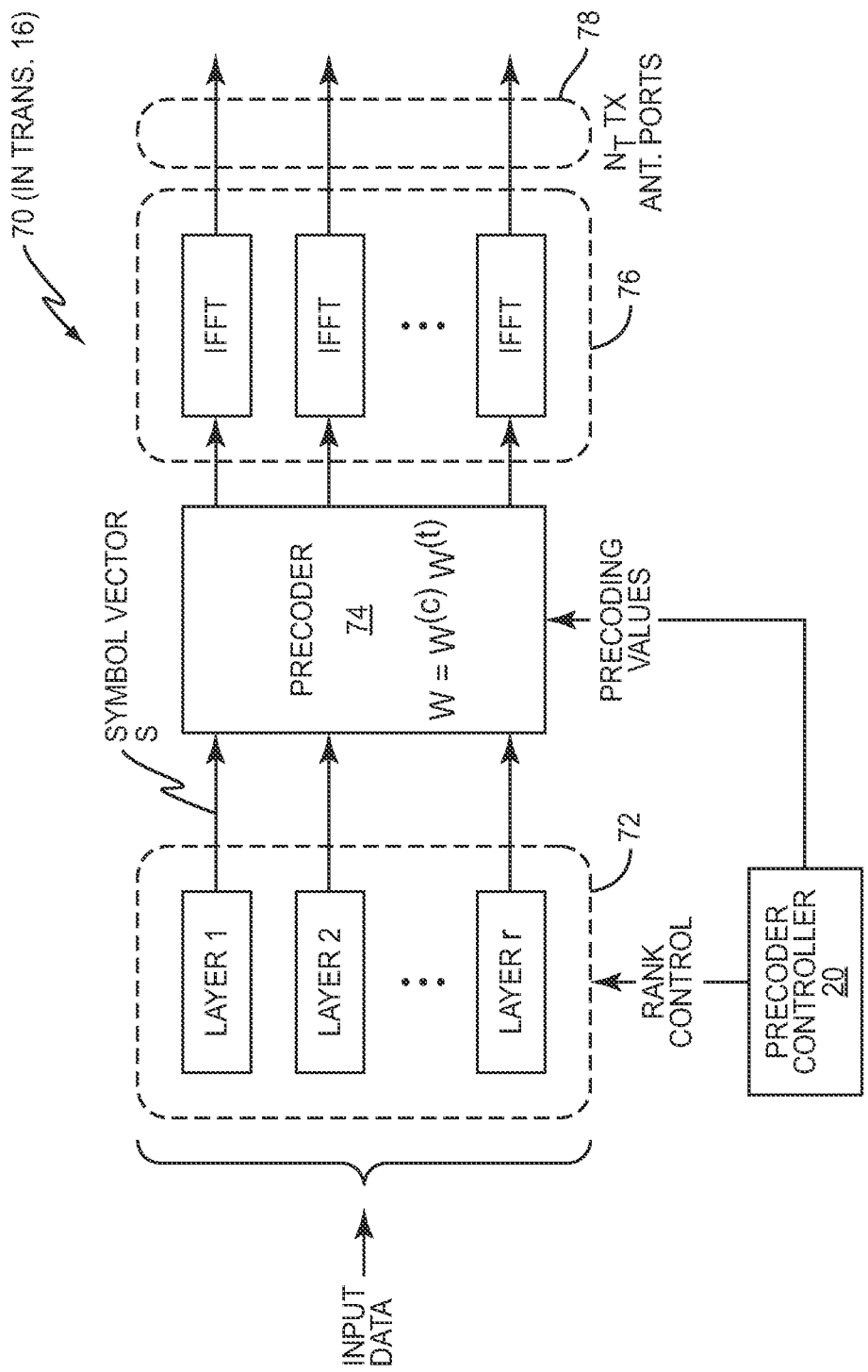
FIG. 7 is a block diagram of one embodiment of a precoding circuit, such as may be implemented in the first transceiver of FIG. 1.

Still further, the feedback processor 22 or the associated precoding controller 20 is configured to determine a precoding operation for precoding a transmission 46 to the second transceiver 12 based at least in part on the precoder recommendation. See, for example, FIG. 7, which depicts a precoding circuit 70 included in the transceiver 16 of the transceiver 10. The precoder circuit 70 enables the transceiver 10 to precode transmissions according to an applied precoding operation, and the transceiver 10 may have more than one such circuit.

According to the example illustration, the precoding circuit 70 receives input data, e.g., information symbols to be transmitted, and it includes layer processing circuit 72 that is responsive to a rank control signal from the precoding controller 20. Depending on the transmit rank in use, the input data is placed onto one or more spatial multiplexing layers and the corresponding symbol vector(s) s are input to a precoder 74.

As an example, the precoder 74 is shown as applying an effective precoder W that is formed as the matrix multiplication of a conversion precoder $W^{(c)}$ and a tuning precoder $W^{(t)}$. More broadly, the precoder 74 applies a precoding operation determined by the precoding value(s) provided to it by the precoding controller 20. Those values may or may not follow the recommendations included in the precoder selection feedback 44 received from the transceiver 12, but the transceiver 10 at least considers those recommendations in its precoding determinations. In any case, the precoder 74 outputs precoded signals to Inverse Fast Fourier Transform (IFFT) processing circuits 76, which in turn provide signals to a number of antenna ports 78 associated with the antennas 14 shown in FIG. 1.

Figure 8:
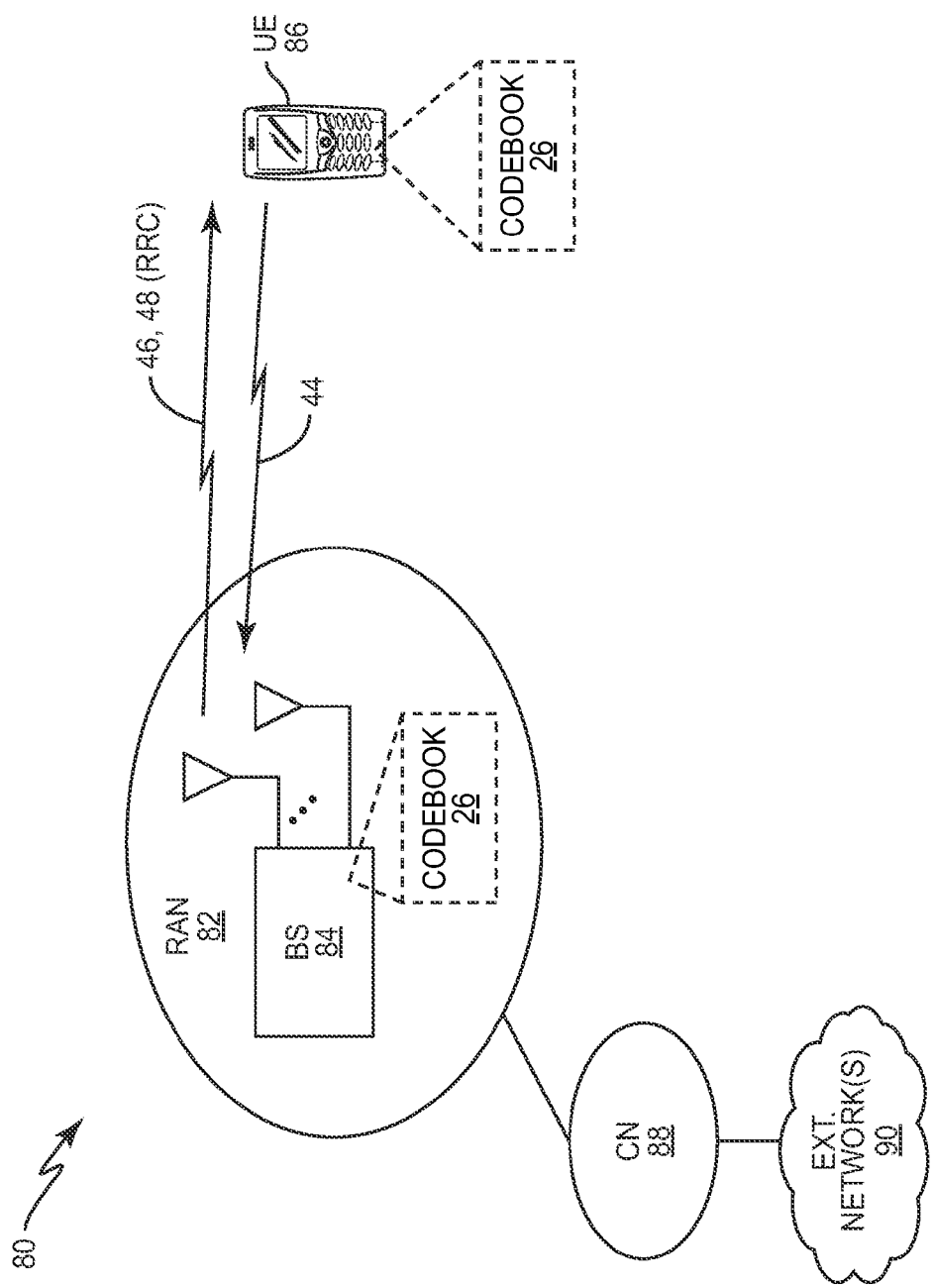
FIG. 8 is a block diagram of one embodiment of a wireless communication network, wherein precoding restriction signaling and processing as taught herein are used between a base station and an item of user equipment (a "UE").

Such precoding offers well understood advantages in the context of wireless communication networks, such as the network 80 illustrated in FIG. 8. Here, the simplified network diagram illustrates a Radio Access Network (RAN) 82, including one or more base stations 84, and an associated Core Network (CN) 88. This arrangement communicatively couples user equipment (UE) 86 to other devices in the same network and/or in one or more other networks. To this end, the CN 88 is communicatively coupled to one or more external networks 90, such as the Internet and/or the PSTN.

Of particular interest herein, one sees that the base station 84 stores one or more codebooks 26, as does the UE 86. For purposes of this example, the base station 84 comprises an eNodeB or other network base station and represents the transceiver 10. Similarly, the UE 86 represents the transceiver 12. As such, one sees precoded transmissions 46 from the base station 84 to the UE 86, along with optional control signaling 48 that indicates to the UE 86 whether it should operate in the first or second feedback mode. Such signaling may be sent using Radio Resource Control (RRC) signaling, for example.

One also sees the transmission of precoder selection feedback 44 from the UE 86 to the base station 84. It will be understood that such signaling is dynamically changed from the first type to the second type, based on the feedback mode of the UE 86. It will also be understood that the second type of precoder selection feedback 44 requires a lower signaling overhead because of the smaller size of the smaller-range index values 56, as compared to the full-range index values 52.

With these network-related possibilities in mind, at least one embodiment of the transceiver 10 uses Discrete Fourier Transform (DFT) based precoders that implement a partially overlapping grid of beams. This approach is suitable for closely spaced co-polarized antennas such as a Uniform Linear Array with $N_T$ elements. Thus, it will be understood that in one or more embodiments, the precoders 28 in the codebook 26 include a number of DFT-based precoders. For example, the precoders 28 may include a number of DFT-based conversion precoders and associated tuning precoders.

DFT based precoders are also suitable for the two $N_T/2$ element antenna group ULAs in a closely spaced cross-pole setup. By a clever choice of the codebook entries for the conversion and tuning precoders and exploiting them jointly, the teachings herein ensure re-use of the DFT based size $N_T/2$ precoders for antenna group ULAs also in forming the needed number of DFT based size $N_T$ precoders for an $N_T$ element ULA. Moreover, one or more embodiments disclosed herein provide a structure for the conversion precoder that allows re-using existing codebooks with DFT based precoders and extending their spatial resolution.

Further, in at least one embodiment, it is proposed herein to use a precoder structure which solves the problems related to PA utilization and rank nested property for a factorized precoder design—e.g., in the case where a precoder W is represented in factorized form by a conversion precoder $W^{(c)}$ and a tuning precoder $W^{(t)}$. By using a so-called double block diagonal tuning precoder combined with a block diagonal conversion precoder, full PA utilization is guaranteed and rank override exploiting nested property also for the overall precoder is possible. However, it should be kept in mind that these and other special precoder types and structures may be represented in subsets or groups within a larger number of precoders 28, and that the codebook 26 may include precoders 28 having different structures.

In any case, an example embodiment illustrates re-using DFT based precoder elements for an antenna group ULA in a closely spaced cross-pole and also in creating a grid of beams with sufficient overlap for a ULA of twice the number of elements compared with the antenna group ULA. In other words, certain precoders 28 in the codebook 26 can be designed for use with the multiple antennas 14 of the transceiver 10, regardless of whether those antennas 14 are configured and operated as an overall ULA of $N_T$ antennas or antenna elements, or as two cross-polarized ULA sub-groups, each having $N_T/2$ antennas or antennal elements.

Consider the block diagonal factorized precoder design given as $$W = W^{(c)}W^{(t)} = \begin{bmatrix} \tilde{W}^{(c)} & 0 \\ 0 & \tilde{W}^{(c)} \end{bmatrix} W^{(t)}, \quad (10)$$

and note that in order to tailor the transmission to ±45 degrees cross-poles, the structure of a conversion precoder can be modified by means of a multiplication from the left with a matrix $$\begin{bmatrix} I & Ie^{j\phi} \\ I & -Ie^{j\phi} \end{bmatrix}, \quad (11)$$

which, for $\phi=0$, rotates the polarizations 45 degrees to align with horizontal and vertical polarization. Other values of $\phi$ may be used to achieve various forms of circular polarization.

Henceforth, it is assumed for purposes of this discussion that such rotations are absorbed into the channel.

For an $N_T$ element ULA, the precoder W for rank 1 is to be a $N_T \times 1$ vector as $$W = w_n^{(N_T,Q)} = \begin{bmatrix} w_{1,n}^{(N_T,Q)} & w_{2,n}^{(N_T,Q)} & \ldots & w_{N_T,n}^{(N_T,Q)} \end{bmatrix}^T. \quad (12)$$

In this context, recall that W may be formed as the product (matrix multiplication) of a given conversion precoder and a corresponding tuning precoder, e.g., $W = W^{(c)}W^{(t)}$. Noting that for antennas $m = 0, 1, \ldots, N_T/2 - 1$, $$w_{m,n}^{(N_T,Q)} = \exp\left(j\frac{2\pi}{N_T Q}mn\right) \quad (13)$$
$$= \exp\left(j\frac{2\pi}{\frac{N_T}{2}(2Q)}mn\right)$$
$$= w_{m,n}^{(N_T/2, 2Q)},$$

$n = 0, \ldots, QN_T - 1,$ while for the remaining antennas $m = N_T/2 + m'$, $m' = 0, 1, \ldots, N_T/2 - 1$, $$w_{N_T/2+m',n}^{(N_T,Q)} = \exp\left(j\frac{2\pi}{N_T Q}(N_T/2 + m')n\right) \quad (14)$$
$$= \exp\left(j\frac{2\pi}{\frac{N_T}{2}(2Q)}m'n\right)\exp\left(j\frac{\pi}{Q}n\right)$$
$$= w_{m',n}^{(N_T/2, 2Q)}\exp\left(j\frac{\pi}{Q}n\right)$$
$$= w_{m',n}^{(N_T/2, 2Q)}\alpha,$$

$n = 0, \ldots, QN_T - 1.$

Here, $\alpha \in \left\{\exp\left(j\frac{\pi}{Q}n\right) : n = 0, 1, \ldots, 2Q-1\right\}.$ Any $N_T$ element DFT precoder can thus be written as $$w_n^{(N_T Q)} = \begin{bmatrix} w_{0,n}^{(N_T,Q)} & w_{1,n}^{(N_T,Q)} & \ldots & w_{N_T-1,n}^{(N_T,Q)} & w_{0,n}^{(N_T,Q)}\alpha \quad (15)$$
$$w_{1,2}^{(N_T,Q)}\alpha \ldots w_{N_T-1,n}^{(N_T,Q)}\alpha \end{bmatrix}^T$$
$$= \begin{bmatrix} w_n^{(N_T/2, 2Q)} \\ w_n^{(N_T 2, 2Q)}\alpha \end{bmatrix}$$
$$= \begin{bmatrix} w_n^{(N_T/2, 2Q)} & 0 \\ 0 & w_n^{(N_T/2, 2Q)} \end{bmatrix}\begin{bmatrix} 1 \\ \alpha \end{bmatrix}.$$

However, this falls under the factorized precoder structure if the tuning precoder codebook contains the precoder elements $$\left\{\begin{bmatrix} 1 \\ \exp\left(j\frac{\pi}{Q}n\right) \end{bmatrix} : n = 0, 1, \ldots, 2Q-1\right\}, \quad (16)$$

and moreover suits the closely spaced cross-polarized array perfectly because size $N_T/2$ DFT precoders are now applied on each antenna group ULA and the tuning precoder provides 2Q different relative phase shifts between the two orthogonal polarizations. It is also seen how the $N_T/2$ element $w_n^{(N_T/2, 2Q)}$ precoders are reused for constructing the $N_T$ element precoder $w_n^{(N_T, Q)}$.

Thus, as an example, the codebook 26 at the transceiver 10 and at the transceiver 12 may be represented as two codebooks, or two sets of precoders 28, with one set comprising conversion precoders $W^{(c)}$ and the other set comprising tuning precoders $W^{(t)}$. As for using full-range index values 52 or smaller-range index values 56 in accordance with the teachings herein, it will be understood that smaller-range index values 56 may be used to index a subset of the conversion precoders $W^{(c)}$ and/or the tuning precoders $W^{(t)}$.

Some or all of the conversion precoders $W^{(c)}$ are DFT based precoders with an oversampling factor 2Q, which are used together with at least some of the tuning precoders $W^{(t)}$ for building DFT based precoders W with oversampling factor Q for an antenna array with twice as many elements. As seen, the oversampling factor Q is now twice as large as for the co-polarized $N_T$ element ULA, but those elements are not wasted because they help to increase the spatial resolution of the grid of beams precoders even further. This characteristic is particularly useful in MU-MIMO applications where good performance relies on the ability to very precisely form beams towards the UE of interest and nulls to the other co-scheduled UEs.

For example, take a special case of $N_T = 8$ transmit antennas—i.e., assume that the transceiver 10 of FIG. 1 includes eight antennas 14, for use in precoded MIMO transmissions, and assume that Q=2 for the closely spaced ULA. One sees that the precoder is built up as $$w_n^{(8,2)} = \begin{bmatrix} w_n^{(N_T/2, 2Q)} \\ w_n^{(N_T 2, 2Q)}\alpha \end{bmatrix} \quad (17)$$
$$= \begin{bmatrix} w_n^{(4,4)} & 0 \\ 0 & w_n^{(4,4)} \end{bmatrix}\begin{bmatrix} 1 \\ \exp\left(j\frac{\pi}{2}n'\right) \end{bmatrix},$$

$n = 0, \ldots, 2N_T - 1,$
$n' = 0, 1, 2, 3.$

The codebook entries for the tuning precoders can then be chosen from the rank 1, 2 Tx codebook in LTE and hence that codebook can be re-used. The codebook for the conversion precoder contains elements constructed from four DFT based generator matrices as in Eq. (8). The codebook 26 can contain other elements in addition to the DFT based ones. Broadly, this principle of constructing N element DFT precoders out of smaller, N/2 element DFT precoders can thus be used in general to add efficient closely spaced ULA and cross-pole support to a codebook based precoding scheme. Advantageously, this particular precoder structure can be used even if the antenna setups differ from what is assumed in this example.

Further, note that DFT-based precoders can be used for higher transmission ranks than one as well. One way is to pick the conversion precoders $\tilde{W}^{(c)}$ as column subsets of DFT-based generator matrices, such as shown in Eq. (8). The tuning precoders can be extended with additional columns as well, to match the desired value of the transmission rank. For transmission rank 2, a tuning precoder $W^{(t)}$ can be selected as $$W^{(t)} = \begin{bmatrix} 1 & 1 \\ \alpha & -\alpha \end{bmatrix}, \alpha \in \left\{ \exp\left(j\frac{\pi}{Q}n\right) : n = 0, 1, \ldots, 2Q-1 \right\}. \quad (18)$$

It is sometimes beneficial to re-use existing codebooks in the design of new codebooks. However, one associated problem is that existing codebooks may not contain all the needed DFT precoder vectors to provide at least Q=2 times oversampling of the grid of beams. Assuming for example that one has an existing codebook for $N_T/2$ antennas with DFT precoders providing $Q=Q_e$ in oversampling factor and that the target oversampling factor for the $N_T/2$ element antenna group ULA is $Q=Q_t$. The spatial resolution of the existing codebook can then be improved to the target oversampling factor in factorized precoder design as $$w = \begin{bmatrix} \Lambda_{\tilde{q}} w_n^{(N_T/2, Q_e)} & 0 \\ 0 & \Lambda_{\tilde{q}} w_n^{(N_T/2, Q_e)} \end{bmatrix} \begin{bmatrix} 1 \\ \alpha \end{bmatrix}, \quad (19)$$

$$n = 0, \ldots, Q_e N_T - 1,$$

$$\tilde{q} = 0, 1, \ldots, Q_t/Q_e - 1$$

$$\Lambda_{\tilde{q}} = \mathrm{diag}\left(1, \exp\left(j\frac{2\pi}{\frac{N_T}{2}}\frac{\tilde{q}}{Q_t}1\right),\right.$$

$$\left.\exp\left(j\frac{2\pi}{\frac{N_T}{2}}\frac{\tilde{q}}{Q_t}2\right), \ldots, \left(j\frac{2\pi}{\frac{N_T}{2}}\frac{\tilde{q}}{Q_t}(N_T/2 - 1)\right)\right).$$

Here, the $w_n^{(N_T/2, Q_e)}$ could be elements in the existing LTE 4 Tx House Holder codebook, which contains 8 DFT based precoders (using an oversampling factor of Q=2) for rank 1. When the transmission rank is higher than one, the block diagonal structure can be maintained and the structure thus generalizes to $$W = \begin{bmatrix} \Lambda_{\tilde{q}} \tilde{W}^{(c)} & 0 \\ 0 & \Lambda_{\tilde{q}} \tilde{W}^{(c)} \end{bmatrix} W^{(t)}, \quad (20)$$

where W is now an $N_T \times r$ matrix, $\tilde{W}^{(c)}$ is a matrix with at least one column equal to a DFT based precoder $w_n^{(N_T/2, Q_e)}$, and the tuning precoder $W^{(t)}$ has r columns.

To see that that the spatial resolution can be improved by multiplying the antenna group precoder with a diagonal matrix as described above, consider the alternative parameterization of DFT precoders in Eq. (7), $$w_{m, Q_t l + q}^{(N_T, Q_t)} = \exp\left(j\frac{2\pi}{N_T} m \left(l + \frac{q}{Q_t}\right)\right), \quad (21)$$

$$m = 0, \ldots, N_T - 1, l = 0, \ldots,$$

$$N_T - 1, q = 0, \ldots, Q_t - 1,$$

and let $$q = \frac{Q_t}{Q_e} q' + \tilde{q}, \quad (22)$$

$$q' = 0, \ldots, Q_e - 1, \tilde{q} = 0, \ldots, \frac{Q_t}{Q_e} - 1,$$

to arrive at $$\begin{aligned} w_{m, Q_t l + \frac{Q_t}{Q_e} q' + \tilde{q}}^{(N_T, Q_t)} &= \exp\left(j\frac{2\pi}{N_T} m \left(l + \frac{1}{Q_t}\left(\frac{Q_t}{Q_e} q' + \tilde{q}\right)\right)\right) \quad (23) \\ &= \exp\left(j\frac{2\pi}{N_T} m \left(l + \frac{q'}{Q_e}\right)\right) \exp\left(j\frac{2\pi}{N_T} m \frac{\tilde{q}}{Q_t}\right) \\ &= w_{m, Q_e l + q'}^{(N_T, Q_e)} \exp\left(j\frac{2\pi}{N_T} m \frac{\tilde{q}}{Q_t}\right) \end{aligned}$$

for $$m = 0, \ldots, N_T - 1, l = 0, \ldots, N_T - 1,$$

$$q' = 0, \ldots, Q_e - 1, \tilde{q} = 0, \ldots, \frac{Q_t}{Q_c} - 1.$$

The above formulations demonstrate an advantageous aspect of the teachings presented herein. Namely, a codebook containing DFT precoders with oversampling factor $Q_e$ can be used for creating a higher resolution DFT codebook by multiplying the m:th element with $$\exp\left(j\frac{2\pi}{N_T} m \frac{\tilde{q}}{Q_t}\right)$$

and hence proving that the diagonal transformation given by $\Lambda_{\tilde{q}}$ indeed works as intended. It is also conceivable that such a structure where the antenna group precoder is multiplied with a diagonal matrix in general (i.e., even when the codebooks are not using DFT based vectors) can improve the performance.

As for the desirable properties of full PA utilization and rank nested property, a first step in designing efficient factorized precoder codebooks while achieving full PA utilization and fulfilling rank nested property is to make the conversion precoders block diagonal as in Eq. (4). In a particular case, the number of columns k of a conversion precoder is made equal to $2\lceil r/2 \rceil$, where $\lceil \bullet \rceil$ denotes the ceil function. This structure is achieved by adding two new columns contributing equally much to each polarization for every other rank. In other words, the conversion precoder $W^{(c)}$ at issue here can be written in the form $$\begin{aligned} W^{(c)} &= \begin{bmatrix} \tilde{W}^{(c)} & 0 \\ 0 & \tilde{W}^{(c)} \end{bmatrix} \quad (24) \\ &= \begin{bmatrix} \tilde{w}_1^{(c)} & \tilde{w}_2^{(c)} & \ldots & \tilde{w}_{\lceil r/2 \rceil}^{(c)} & 0 & 0 & \ldots & 0 \\ 0 & 0 & \ldots & 0 & \tilde{w}_1^{(c)} & \tilde{w}_2^{(c)} & \ldots & \tilde{w}_{\lceil r/2 \rceil}^{(c)} \end{bmatrix}, \end{aligned}$$

where $\tilde{w}_l^{(c)}$ is an $N_T/2 \times 1$ vector.

Extending the conversion dimension in this manner helps keep the number of dimensions small and in addition serves to make sure that both polarizations are excited equally much. It is beneficial if the conversion precoder, denoted here as $\tilde{W}^{(c)}$, is also made to obey a generalized rank nested property in that there is freedom to choose $\tilde{W}^{(c)}$ with L columns as an arbitrary column subset of each possible $\tilde{W}^{(c)}$ with L+1 columns. An alternative is to have the possibility to signal the column ordering used in $\tilde{W}^{(c)}$. Flexibility in the choice of columns for $\tilde{W}^{(c)}$ for the different ranks is beneficial so as to still be able to transmit into the strongest subspace of the channel even when rank override using a column subset is performed.

To ensure full PA utilization, e.g., at the transceiver 10, the tuning precoders $W^{(t)}$ are constructed as follows: (a) the conversion vector $\tilde{w}_n^{(c)}$ is made constant modulus; and (b) a column in the tuning precoder has exactly two non-zero elements with constant modulus. If the m:th element is non-zero, so is element $m+\lceil r/2 \rceil$. Hence for rank $r=4$, the columns in the tuning precoder are of the following form $$\begin{bmatrix} x \\ 0 \\ x \\ 0 \end{bmatrix}, \begin{bmatrix} 0 \\ x \\ 0 \\ x \end{bmatrix}, \quad (25)$$

where x denotes an arbitrary non-zero value which is not necessarily the same from one x to another. Because there are two non-zero elements in a column, two orthogonal columns with the same positions of the non-zero elements can be added before columns with other non-zero positions are considered. Such pairwise orthogonal columns with constant modulus property can be parameterized as $$\begin{bmatrix} 1 \\ 0 \\ e^{j\phi} \\ 0 \end{bmatrix}, \begin{bmatrix} 1 \\ 0 \\ -e^{j\phi} \\ 0 \end{bmatrix}. \quad (26)$$

Rank nested property for the overall precoder is upheld when increasing the rank by one by ensuring that columns for previous ranks excite the same columns of the conversion precoder also for the higher rank. Combining this with Eq. (25) and the mentioned pairwise orthogonal property of the columns leads to a double block diagonal structure of the tuning precoder taking the form $$W = \begin{bmatrix} \tilde{w}_1^{(c)} & \tilde{w}_2^{(c)} & \dots & \tilde{w}_{\lceil r/2 \rceil}^{(c)} & 0 & 0 & \dots & 0 \\ 0 & 0 & \dots & 0 & \tilde{w}_1^{(c)} & \tilde{w}_2^{(c)} & \dots & \tilde{w}_{\lceil r/2 \rceil}^{(c)} \end{bmatrix} \quad (27)$$

$$\begin{bmatrix} x & x & 0 & 0 & \dots \\ 0 & 0 & x & x & \\ \vdots & & & & \ddots \\ x & x & 0 & 0 & \dots \\ 0 & 0 & x & x & \\ \vdots & & & & \ddots \end{bmatrix}.$$

Using the pairwise orthogonality property in Eq. (26), and representing the precoder structure $W$ as $W^{(c)}W^{(t)}$, the precoder structure can be further specialized into $$W = \begin{bmatrix} \tilde{w}_1^{(c)} & \tilde{w}_2^{(c)} & \dots & \tilde{w}_{\lceil r/2 \rceil}^{(c)} & 0 & 0 & \dots & 0 \\ 0 & 0 & \dots & 0 & \tilde{w}_1^{(c)} & \tilde{w}_2^{(c)} & \dots & \tilde{w}_{\lceil r/2 \rceil}^{(c)} \end{bmatrix} \quad (28)$$

$$\begin{bmatrix} 1 & 1 & 0 & 0 & \dots \\ 0 & 0 & 1 & 1 & \\ \vdots & & & & \ddots \\ e^{j\varphi_l} & -e^{j\varphi_l} & 0 & 0 & \dots \\ 0 & 0 & e^{j\varphi_2} & -e^{j\varphi_2} & \\ \vdots & & & & \ddots \end{bmatrix}$$

Note that the double block diagonal structure for the tuning precoder can be described in different ways depending on the ordering of the columns used for storing the conversion precoders $W^{(c)}$ as entries in the codebook 26. It is possible to equivalently make the tuning precoders $W^{(t)}$ block diagonal by writing $$W = \begin{bmatrix} \tilde{w}_1^{(c)} & 0 & \tilde{w}_2^{(c)} & 0 & \dots & \dots & \tilde{w}_{\lceil r/2 \rceil}^{(c)} & 0 \\ 0 & \tilde{w}_1^{(c)} & 0 & \tilde{w}_2^{(c)} & \dots & \dots & 0 & \tilde{w}_{\lceil r/2 \rceil}^{(c)} \end{bmatrix} \quad (29)$$

$$\begin{bmatrix} x & x & 0 & 0 & \dots & & 0 & 0 \\ x & x & 0 & 0 & & & & \vdots \\ 0 & 0 & x & x & & \ddots & & \\ \vdots & & x & x & & & & \\ & & 0 & 0 & \ddots & & & \\ \vdots & & & & & & 0 & 0 \\ & & & & & \ddots & x & x \\ 0 & 0 & 0 & 0 & \dots & 0 & x & x \end{bmatrix}.$$

Re-orderings similar to these do not affect the overall precoder W and are thus considered equivalent and assumed to be covered under the terms "block diagonal conversion precoder and double block diagonal tuning precoder." It is also interesting to note that if the requirements on the orthogonality constraint and full PA utilization are relaxed, the design for rank nested property can be summarized with the following structure for the tuning precoders $$\begin{bmatrix} x & x & x & x & x & x \\ 0 & 0 & x & x & x & x \\ \vdots & & & x & x & \ddots \\ x & x & x & x & x & x \\ 0 & 0 & x & x & x & x \\ \vdots & & & x & x & \ddots \end{bmatrix}. \quad (30)$$

Finally, it is worth mentioning that rank nested property can be useful when applied separately to the conversion precoders and the tuning precoder. Even applying it only to the tuning precoders can help save computational complexity, because precoder calculations across ranks can be re-used as long as the selected conversion precoder $W^{(c)}$ remains fixed.

As an illustrative example for eight transmit antennas 14 at the transceiver 10, assume that Rank $r=1$ $$W = \begin{bmatrix} w_1^{(1)} & \\ & w_1^{(1)} \end{bmatrix} \begin{bmatrix} 1 \\ e^{j\varphi_k} \end{bmatrix} \quad (31)$$

Rank r=2

$$W = \begin{bmatrix} w_1^{(1)} & \\ & w_1^{(1)} \end{bmatrix} \begin{bmatrix} 1 & 1 \\ e^{j\varphi_k} & -e^{j\varphi_k} \end{bmatrix} \quad (32)$$

Rank r=3

$$W = \begin{bmatrix} w_1^{(1)} & w_2^{(1)} & \\ & & w_1^{(1)} & w_2^{(1)} \end{bmatrix} \begin{bmatrix} 1 & 1 & 0 \\ 0 & 0 & 1 \\ e^{j\varphi_k} & e^{j\varphi_k} & 0 \\ 0 & 0 & e^{j\varphi_l} \end{bmatrix} \quad (33)$$

Rank r=4

$$W = \begin{bmatrix} w_1^{(1)} & w_2^{(1)} & \\ & & w_1^{(1)} & w_2^{(1)} \end{bmatrix} \begin{bmatrix} 1 & 1 & 0 & 0 \\ 0 & 0 & 1 & 1 \\ e^{j\varphi_k} & -e^{j\varphi_k} & 0 & 0 \\ 0 & 0 & e^{j\varphi_l} & -e^{j\varphi_l} \end{bmatrix} \quad (34)$$

Rank r=5

$$W = \begin{bmatrix} w_1^{(1)} & w_2^{(1)} & w_3^{(1)} & \\ & & & w_1^{(1)} & w_2^{(1)} & w_3^{(1)} \end{bmatrix} \quad (35)$$

$$\begin{bmatrix} 1 & 1 & 0 & 0 & 0 \\ 0 & 0 & 1 & 1 & 0 \\ 0 & 0 & 0 & 0 & 1 \\ e^{j\varphi_k} & -e^{j\varphi_k} & 0 & 0 & 0 \\ 0 & 0 & e^{j\varphi_l} & -e^{j\varphi_l} & 0 \\ 0 & 0 & 0 & 0 & e^{j\varphi_m} \end{bmatrix}$$

Rank r=6

$$W = \begin{bmatrix} w_1^{(1)} & w_2^{(1)} & w_3^{(1)} & \\ & & & w_1^{(1)} & w_2^{(1)} & w_3^{(1)} \end{bmatrix} \quad (36)$$

$$\begin{bmatrix} 1 & 1 & 0 & 0 & 0 & 0 \\ 0 & 0 & 1 & 1 & 0 & 0 \\ 0 & 0 & 0 & 0 & 1 & 1 \\ e^{j\varphi_k} & -e^{j\varphi_k} & 0 & 0 & 0 & 0 \\ 0 & 0 & e^{j\varphi_l} & -e^{j\varphi_l} & 0 & 0 \\ 0 & 0 & 0 & 0 & e^{j\varphi_m} & -e^{j\varphi_m} \end{bmatrix}$$

Rank r=7

$$W = \begin{bmatrix} w_1^{(1)} & w_2^{(1)} & w_3^{(1)} & w_4^{(1)} & \\ & & & & w_1^{(1)} & w_2^{(1)} & w_3^{(1)} & w_4^{(1)} \end{bmatrix} \quad (37)$$

$$\begin{bmatrix} 1 & 1 & 0 & 0 & 0 & 0 & 0 \\ 0 & 0 & 1 & 1 & 0 & 0 & 0 \\ 0 & 0 & 0 & 0 & 1 & 1 & 0 \\ 0 & 0 & 0 & 0 & 0 & 0 & 1 \\ e^{j\varphi_k} & -e^{j\varphi_k} & 0 & 0 & 0 & 0 & 0 \\ 0 & 0 & e^{j\varphi_l} & -e^{j\varphi_l} & 0 & 0 & 0 \\ 0 & 0 & 0 & 0 & e^{j\varphi_m} & -e^{j\varphi_m} & 0 \\ 0 & 0 & 0 & 0 & 0 & 0 & e^{j\varphi_n} \end{bmatrix}$$

Rank r=8

$$W = \begin{bmatrix} w_1^{(1)} & w_2^{(1)} & w_3^{(1)} & w_4^{(1)} & \\ & & & & w_1^{(1)} & w_2^{(1)} & w_3^{(1)} & w_4^{(1)} \end{bmatrix} \quad (38)$$

$$\begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ e^{j\varphi_k} & -e^{j\varphi_k} & 0 & 0 & 0 & 0 & 0 & 0 \\ 0 & 0 & e^{j\varphi_l} & -e^{j\varphi_l} & 0 & 0 & 0 & 0 \\ 0 & 0 & 0 & 0 & e^{j\varphi_m} & -e^{j\varphi_m} & 0 & 0 \\ 0 & 0 & 0 & 0 & 0 & 0 & e^{j\varphi_n} & -e^{j\varphi_n} \end{bmatrix}$$

The 4 Tx case follows in a similar manner.

As for the use of first and second types of precoder selection feedback 44, with the second type having a reduced signaling overhead, consider the factorized precoder design being used by way of example herein. Namely, the transceiver 12 uses the precoder selection feedback 44 to indicate an overall precoder W to the transceiver 10, as its precoding recommendation. More particularly, the overall precoder W is represented by the combination of a selected one of the conversion precoders $W^{(c)}$ in the codebook 26 and a selected one of the tuning precoders $W^{(t)}$ in the codebook 26 (or in another stored codebook). Of course, the transceiver 10 is configured to understand and process the factorized precoder format—i.e., it understands that the recommended overall precoder W is formed as the matrix multiplication (product) of a recommended conversion precoder $W^{(c)}$ and a recommended tuning precoder $W^{(t)}$. As one example, then, the transceiver 12 uses the precoder selection feedback 44 to indicate its recommendations for conversion and tuning precoders $W^{(c)}$ and $W^{(t)}$. In so doing, it may use full-range index values to indicate conversion precoder recommendations when operating in the first feedback mode, and may use smaller-range index values to indicate conversion precoder recommendations when operating in the second feedback mode. (Additionally, or alternatively, it may use full- and smaller-range index values for indicating its tuning precoder recommendations.) In this regard, it will be understood that the second feedback mode entails the transceiver 12 selecting precoders from a smaller subset of the defined conversion precoders $W^{(c)}$ and/or from a smaller subset of the defined tuning precoders $W^{(c)}$.

In any case, one has the overall precoder W formed as $$W = \begin{bmatrix} \tilde{W}^{(c)} & 0 \\ 0 & \tilde{W}^{(c)} \end{bmatrix} W^{(t)}. \quad (39)$$

If the codebook for the antenna group precoder $\tilde{W}^{(c)}$ contains a set of DFT based precoders, then these precoders can be sub-sampled by lowering the oversampling factor. This example of sub-sampling results in only being able to use every K:th beam in the grid of beams. Sub-sampling of the codebook can also be performed by selecting the M precoders out of N precoders in the codebook which maximizes the minimum distance between the selected precoders on the Grassmanian manifold. Distances here can be measured, for example, as Chordal distance, projection two-norm distance, or Fubini-Study distance.

Sub-sampling principles as described above can also be applied to the tuning precoders or to any precoder design. The sub-sampled codebook(s) can then be used on lower payload capable channels, e.g., PUCCH in LTE, while the full codebooks are used on the more capable ones, e.g., PUSCH in LTE.

In other words, taking the conversion precoders $W^{(c)}$ as an example, one may assume that there are N conversion precoders $W^{(c)}$ overall. A full-range index value 52 may be used to index this full set of precoders, while a smaller-range index value 56 may be used to index a subset of them, e.g., every K:th one of them. Additionally, or alternatively, full-range and restricted range index values can be used to index all or a sub-sampled set of the tuning precoders $W^{(t)}$. This approach can be understood as using subsampling to provide "coarse" CSI reporting on the PUCCH, while providing richer, higher-resolution CSI reporting on the PUSCH. For example, the use of codebook subset restrictions allows an LTE eNodeB to configure a UE to only use a subset of the possible precoders 28 in a codebook 26, for computing and reporting CSI feedback (including the precoder selection feedback 44).

Of course, the teachings herein are not limited to the specific, foregoing illustrations. For example, terminology from 3GPP LTE was used in this disclosure to provide a relevant and advantageous context for understanding operations at the transceivers 10 and 12, which were identified in one or more embodiments as being an LTE eNodeB and an LTE UE, respectively. However, the teachings disclosed herein are not limited to these example illustrations and may be advantageously applied to other contexts, such as networks based on WCDMA, WiMax, UMB or GSM.

Further, the transceiver 10 and the transceiver 12 are not necessarily a base station and an item of mobile equipment within a standard cellular network, although the teachings herein have advantages in such a context. Moreover, while the particular wireless network examples given herein involve the "downlink" from an eNodeB or other network base station, the teachings presented herein also have applicability to the uplink. More broadly, it will be understood that the teachings herein are limited by the claims and their legal equivalents, rather than by the illustrative examples given herein.

What is claimed is:

1. A method in a second wireless communication transceiver of providing precoder selection feedback to a first wireless communication transceiver, as precoding information for said first transceiver, wherein said method includes determining channel conditions at the second transceiver and comprises:

when operating in a first feedback mode:
selecting a precoder from a predetermined set of precoders based on said channel conditions wherein at least some of the precoders in the predetermined set of precoders are based on a factorized precoder design comprising a conversion precoder with a block diagonal matrix structure and a tuning precoder with a double block diagonal matrix structure, and
sending a full-range index value, with the ability to indicate any of the precoders in the predetermined set, for the selected precoder to said first transceiver as said precoder selection feedback;

when operating in a second feedback mode:
selecting a precoder from a smaller, predetermined subset of precoders contained within the predetermined set of precoders based on said channel conditions wherein the predetermined subset of precoders is based on the factorized precoder design, and
sending a smaller-range index value, with the ability to only indicate precoders within the predetermined subset of precoders, for the selected precoder to said first transceiver as said precoder selection feedback; and
using a smaller signaling payload for sending smaller-range index values as compared to the signaling payload used to send full-range index values.

2. The method of claim 1, wherein the second transceiver sends the precoder selection feedback at certain first times on a control channel and at certain second times the transceiver on a data channel, and wherein the method further comprises selecting said first feedback mode when sending the precoder selection feedback multiplexed together with data on the same physical channel and selecting said second feedback mode when sending the precoder selection feedback on the control channel.

3. The method of claim 2, wherein the first and second transceivers operate in accordance with Long Term Evolution, LTE, air interface standards, and wherein the control channel comprises the LTE Physical Uplink Control Channel, PUCCH, and said data channel comprises the LTE Physical Uplink Shared Channel, PUSCH.

4. The method of claim 1, further comprising using the smaller signaling payload to send the smaller-range index values as compared to the signaling payload used to send the full-range index values comprises using a smaller number of bits to represent the smaller-range index values as compared to the number of bits used to represent the full-range index values.

5. The method of claim 1, further comprising dynamically selecting either the first or the second feedback modes responsive to receiving control signaling from the first transceiver.

6. The method of claims 1, wherein the predetermined set of precoders comprises a predetermined set of DFT-based precoders providing a first spatial resolution for beam forming at the first transceiver, and wherein the predetermined subset of precoders contained within the predetermined set comprises a subset of the same DFT-based precoders providing a second spatial resolution for said beam forming at the first transceiver, said second spatial resolution being lower than said first spatial resolution.

7. The method of claims 1, wherein the predetermined set of precoders includes a number of DFT-based precoders representing a total of N DFT-based beams for transmission beamforming, and wherein the predetermined subset of precoders represents a total of M DFT-based beams for transmission beamforming and corresponds to every R-th one of said N DFT-based beams, where N, M, and R are integer values and M<N.

8. The method of claim 7, wherein at least some of the precoders in the predetermined set of precoders correspond to a set of N different conversion precoders and a set of tuning precoders, and wherein each said conversion precoder comprises a block diagonal matrix in which each block comprises a DFT-based precoder that defines N different DFT-based beams for a subgroup in a group of $N_T$ transmit antenna ports at the first transceiver, and the predetermined subset of precoders represents every R-th one of said N DFT-based beams.

9. The method of claim 1, further comprising selecting said second feedback mode when sending precoder selection feedback as an unscheduled transmission, and selecting said first feedback mode when sending precoder selection feedback as a scheduled transmission.

10. A wireless communication transceiver configured to provide precoder selection feedback to another wireless communication transceiver as precoding information for said other transceiver, said transceiver comprising a receiver configured to receive signals from said other transceiver and a channel estimator configured to estimate channel conditions at said transceiver with respect to signals received from said other transceiver, and wherein said transceiver comprises:
- a transmitter configured to transmit signals to said other transceiver, including signals conveying said precoder selection feedback; and
- a precoding feedback generator configured to determine whether to operate in a first feedback mode or a second feedback mode and further configured to:
- when operating in the first feedback mode:
- select a precoder from a predetermined set of precoders based on said channel conditions wherein at least some of the precoders in the predetermined set of precoders are based on a factorized precoder design comprising a conversion precoder with a block diagonal matrix structure and a tuning precoder with a double block diagonal matrix structure, and
- send a full-range index value, with the ability to indicate any of the precoders in the predetermined set, for the selected precoder to said other transceiver as said precoder selection feedback; and
- when operating in the second feedback mode:
- select a precoder from a predetermined subset of precoders contained in said predetermined set of precoders based on said channel conditions wherein the predetermined subset of precoders is based on the factorized precoder design, and
- send a smaller-range index value, with the ability to only indicate precoders within the predetermined subset of precoders, for the selected precoder to said other transceiver as said precoder selection feedback;
- wherein said precoding feedback generator is configured to use a smaller signaling payload for sending smaller-range index values as compared to the signaling payload used to send full-range index values.

11. The transceiver of claim 10, wherein the transceiver is configured to send said precoder selection feedback at certain first times on a control channel and at certain second times on a data channel, and wherein said precoding feedback generator is configured to select said first feedback mode when sending said precoder selection feedback multiplexed together with data on the same physical channel and to select said second feedback mode when sending said precoder selection feedback on said control channel.

12. The transceiver of claim 11, wherein the transceiver and said other transceiver are configured to operate in accordance with Long Term Evolution, LTE, air interface standards, and wherein said control channel comprises the LTE Physical Uplink Control Channel, PUCCH, and said data channel comprises the LTE Physical Uplink Shared Channel, PUSCH.

13. The transceiver of claim 10, wherein the transceiver is configured to use the smaller signaling payload for sending the smaller-range index values as compared to sending the full-range index values based on being configured to use a smaller number of bits to represent the smaller-range index values as compared to the number of bits used to represent the full-range index values.

14. The transceiver of claim 10, wherein said transceiver is configured to dynamically select either the first or the second feedback mode in response to receiving control signaling from said other transceiver.

15. The transceiver of claim 10, wherein said predetermined set of precoders comprises a predetermined set of DFT-based precoders providing a first spatial resolution for beam forming at said other transceiver, and wherein the predetermined subset of precoders contained within said predetermined set of precoders comprises a subset of the same DFT-based precoders providing a second spatial resolution for said beam forming at said other transceiver, said second spatial resolution being lower than said first spatial resolution.

16. The transceiver of claim 10, wherein the predetermined set of precoders includes a number of DFT-based precoders representing a total of N DFT-based beams for transmission beamforming, and wherein the predetermined subset of precoders represents a total of M DFT-based beams for transmission beamforming and corresponds to every R-th one of said N DFT-based beams, where N, M, and R are integer values and M<N.

17. The transceiver of claim 16, wherein at least some of the precoders in said predetermined set of precoders correspond to a set of N different conversion precoders and a set of tuning precoders, and wherein each said conversion precoder comprises a block diagonal matrix in which each block comprises a DFT-based precoder that defines N different DFT-based beams for a subgroup in a group of $N_T$ transmit antenna ports at the first transceiver, and the predetermined subset of precoders represents every R-th one of said N DFT-based beams.

18. The transceiver of claim 10, wherein said transceiver is configured to select said second feedback mode when sending said precoder selection feedback as an unscheduled transmission, and to select said first feedback mode when sending said precoder selection feedback as a scheduled transmission.

19. A method at a first wireless communication transceiver of determining a precoder recommendation from a second wireless communication transceiver, said method comprising:
- receiving precoder selection feedback from the second transceiver;
- determining whether the precoder selection feedback comprises a first type of precoder selection feedback including a full-range index value, or a second type of precoder selection feedback including a smaller-range index value that is signaled by the second transceiver using a lower signaling overhead as compared to that used for signaling full-range index values;
- if the precoder selection feedback is the first type of precoder selection feedback, identifying the precoder recommendation by identifying a precoder from a predetermined set of precoders indexed by the full-range index value included in the precoder selection feedback, wherein at least some of the precoders in the predetermined set of precoders are based on a factorized precoder design comprising a conversion precoder with a block diagonal matrix structure and a tuning precoder with a double block diagonal matrix structure;

if the precoder selection feedback is the second type of precoder selection feedback, identifying the precoder recommendation by identifying a precoder from a predetermined subset of precoders indexed by the smaller-range index value included in the precoder selection feedback, said predetermined subset of precoders including at least one precoder based on the factorized precoder design contained within the predetermined set of precoders; and determining a precoding operation for precoding a transmission to the second transceiver based at least in part on the precoder recommendation.

20. The method of claim 19, further comprising receiving said first type of precoder selection feedback on a data channel and receiving said second type of precoder selection feedback on a control channel.

21. The method of claim 20, wherein the first and second transceivers operate in accordance with Long Term Evolution, LTE, air interface standards, and wherein said control channel comprises the LTE Physical Uplink Control Channel, PUCCH, and said data channel comprises the LTE Physical Uplink Shared Channel, PUSCH.

22. The method of claim 19, further comprising sending control signaling to the second transceiver to control whether the second transceiver sends the first type or the second type of precoder selection feedback.

23. The method of claim 19, wherein said predetermined set of precoders comprises a predetermined set of DFT-based precoders providing a first spatial resolution for beam forming at said first transceiver, and wherein the predetermined subset of precoders contained within said predetermined set comprises a subset of the same DFT-based precoders providing a second spatial resolution for said beam forming at said first transceiver, said second spatial resolution being lower than said first spatial resolution.

24. The method of claim 19, wherein said predetermined set of precoders represents a total of N DFT-based beams for transmission beamforming by said transceiver, and wherein the predetermined subset of precoders represents a total of M DFT-based beams for transmission beamforming and corresponds to every R-th one of said N DFT-based beams, where N, M, and R are integer values and M<N.

25. The method of claim 24, wherein said M precoders are selected from the N precoders to minimize distances on a Grassmanian manifold between the M precoders.

26. A wireless communication transceiver configured to determine a precoder recommendation from another wireless communication transceiver, said transceiver comprising:

a receiver configured to receive precoder selection feedback from the other transceiver;

a feedback processor configured to determine whether the precoder selection feedback comprises a first type of precoder selection feedback including a full-range index value, or a second type of precoder selection feedback including a smaller-range index value that is signaled by the other transceiver using a lower signaling overhead as compared to that used for signaling full-range index values;

said feedback processor configured to:

if the precoder selection feedback is the first type of precoder selection feedback, identify the precoder recommendation by identifying a precoder from a predetermined set of precoders indexed by the full-range index value included in the precoder selection feedback, wherein at least some of the precoders in the predetermined set of precoders are based on a factorized precoder design comprising a conversion precoder with a block diagonal matrix structure and a tuning precoder with a double block diagonal matrix structure; and if the precoder selection feedback is the second type of precoder selection feedback, identify the precoder recommendation by identifying a precoder from a predetermined subset of precoders indexed by the smaller-range index value included in the precoder selection feedback, said predetermined subset of precoders including at least one precoder based on the factorized precoder design contained within the predetermined set of precoders; and wherein said feedback processor or an associated precoding controller is configured to determine a precoding operation for precoding a transmission to the other transceiver based at least in part on the precoder recommendation.

27. The transceiver of claim 26, wherein said transceiver is configured to receive the first type of precoder selection feedback over a data channel between the transceivers, and is configured to receive the second type of precoder selection feedback over a control channel between the transceivers.

28. The transceiver of claim 27, wherein said transceiver is an eNodeB configured for operation a wireless communication network based on 3GPP Long Term Evolution (LTE) standards, and wherein the data channel comprises the LTE Physical Uplink Shared Channel, PUSCH, and the control channel comprises the LTE Physical Uplink Control Channel (PUCCH).

29. The transceiver of claim 26, wherein the predetermined set of precoders comprises a predetermined set of DFT-based precoders providing a first spatial resolution for beam forming at said transceiver, and wherein the predetermined subset of precoders contained within the predetermined set comprises a subset of the same DFT-based precoders providing a second spatial resolution for said beam forming at said transceiver, said second spatial resolution being lower than said first spatial resolution.

30. The transceiver of claim 26, wherein the predetermined set of precoders represents a total of N DFT-based beams for transmission beamforming by said transceiver, and wherein the predetermined subset of precoders represents a total of M DFT-based beams for transmission beamforming by said transceiver and corresponds to every R-th one of said N DFT-based beams, where N, M, and R are integer values and M<N, and wherein said other transceiver uses said smaller-range index values to indicate precoder selections from among the M precoders in the predetermined subset and uses said full-range index values to indicate precoder selections from among the N precoders in the predetermined set.

* * * * *

UNITED STATES PATENT AND TRADEMARK OFFICE
CERTIFICATE OF CORRECTION

PATENT NO. : 8,767,681 B2
APPLICATION NO. : 13/080826
DATED : July 1, 2014
INVENTOR(S) : Hammarwall et al.

It is certified that error appears in the above-identified patent and that said Letters Patent is hereby corrected as shown below:

On Title Page 2, in Item (56), under "OTHER PUBLICATIONS", in Column 1, Line 9, delete "Fransicso," and insert -- Francisco, --, therefor.

In the Specification

In Column 13, Line 60, delete "index value 54" and insert -- index value 56 --, therefor.

In Column 17, Lines 46-49, in Equation (15), delete "$w_n^{(N_T,Q)} = \left[ w_{0,n}^{(N_T,Q)} \ w_{1,n}^{(N_T,Q)} \ \ldots \ w_{N_T-1,n}^{(N_T,Q)} \ w_{0,n}^{(N_T,Q)}\alpha \ w_{1,n}^{(N_T,Q)}\alpha \ \ldots \ w_{N_T-1,n}^{(N_T,Q)}\alpha \right]^T$" and insert -- $w_n^{(N_T,Q)} = \left[ w_{0,n}^{(N_T,Q)} \ w_{1,n}^{(N_T,Q)} \ \ldots \ w_{N_T-1,n}^{(N_T,Q)} \ w_{0,n}^{(N_T,Q)}\alpha \ w_{1,n}^{(N_T,Q)}\alpha \ \ldots \ w_{N_T-1,n}^{(N_T,Q)}\alpha \right]^T$ --, therefor.

In Column 19, Lines 28-30, in Equation (19), delete "$\exp\left(j\frac{2\pi}{\frac{N_T}{2}}\frac{\tilde{q}}{Q_t}2\right), \ldots, \left(j\frac{2\pi}{\frac{N_T}{2}}\frac{\tilde{q}}{Q_t}(N_T/2-1)\right)\right).$" and insert -- $\exp\left(j\frac{2\pi}{\frac{N_T}{2}}\frac{\tilde{q}}{Q_t}2\right), \ldots, \exp\left(j\frac{2\pi}{\frac{N_T}{2}}\frac{\tilde{q}}{Q_t}(N_T/2-1)\right)\right).$ --, therefor.

Signed and Sealed this
Third Day of March, 2015

Michelle K. Lee
*Deputy Director of the United States Patent and Trademark Office*

In Column 20, Lines 19-20, delete "$q' = 0, \ldots, Q_e - 1, \tilde{q} = 0, \ldots, \frac{Q_t}{Q_c} - 1.$" and insert -- $q' = 0, \cdots, Q_c - 1, \tilde{q} = 0, \cdots, \frac{Q_t}{Q_e} - 1.$ --, therefor.

In the Claims

In Column 26, Line 54, in Claim 6, delete "claims 1," and insert -- claim 1, --, therefor.

In Column 26, Line 63, in Claim 7, delete "claims 1," and insert -- claim 1, --, therefor.